(12) United States Patent
Monteverdi et al.

(10) Patent No.: US 12,180,740 B2
(45) Date of Patent: Dec. 31, 2024

(54) AUTOMATED PARKING GARAGE

(71) Applicant: Robotic Technology Administration, LLC, Clearwater, FL (US)

(72) Inventors: Royce S. Monteverdi, Clearwater, FL (US); Rajeev Aswal, Clearwater, FL (US); Ramanathan Ramasubbu, Clearwater, FL (US)

(73) Assignee: Robotic Technology Administration, LLC, Clearwater, FL (US)

( * ) Notice: Subject to any disclaimer, the term of this patent is extended or adjusted under 35 U.S.C. 154(b) by 341 days.

(21) Appl. No.: 17/572,873

(22) Filed: Jan. 11, 2022

(65) Prior Publication Data

US 2023/0220697 A1 Jul. 13, 2023

(51) Int. Cl.
| | |
|---|---|
| *E04H 6/42* | (2006.01) |
| *A47L 9/06* | (2006.01) |
| *A47L 9/28* | (2006.01) |
| *B60L 53/00* | (2019.01) |
| *B60L 53/16* | (2019.01) |
| *B60L 53/30* | (2019.01) |
| *B60L 53/60* | (2019.01) |
| *B60W 30/06* | (2006.01) |
| *B60W 60/00* | (2020.01) |
| *E04H 6/24* | (2006.01) |
| *H02J 7/00* | (2006.01) |

(52) U.S. Cl.
CPC ............... *E04H 6/424* (2013.01); *A47L 9/06* (2013.01); *A47L 9/2805* (2013.01); *A47L 9/2836* (2013.01); *B60L 53/16* (2019.02); *B60L 53/30* (2019.02); *B60L 53/60* (2019.02); *B60W 30/06* (2013.01); *B60W 60/001* (2020.02); *E04H 6/24* (2013.01); *H02J 7/0042* (2013.01); *B60W 2556/45* (2020.02)

(58) Field of Classification Search
CPC . E04H 6/424; E04H 6/24; B60L 53/60; B60L 53/16; B60L 53/30; B60W 60/001; B60W 30/06; B60W 2556/45; A47L 9/06; A47L 9/2805; A47L 9/2836; H02J 7/0042
USPC .......................................................... 701/25
See application file for complete search history.

(56) References Cited

U.S. PATENT DOCUMENTS

| | | |
|---|---|---|
| 6,502,011 B2 | 12/2002 | Haag |
| 6,662,077 B2 | 12/2003 | Haag |

(Continued)

OTHER PUBLICATIONS

"Robotic Parking Systems—Multiple Simultaneous Motions"; Youtube Sep. 22, 2010 URL: https://www.youtube.com/watch?v=ixZM8d-X_4c&t=65s (Date Accessed: Aug. 3, 2022).

(Continued)

*Primary Examiner* — Mahmoud S Ismail
(74) *Attorney, Agent, or Firm* — Black McCuskey

(57) ABSTRACT

An automated parking garage with one or more novel features described herein. These novel features include a modular design a control system that is operable to move multiple items, such as vehicles, independently so that they can move concurrently or simultaneously, at least one storage space that comprises an electric vehicle charging station, the ability to communicate with autonomous (e.g., self-driving) vehicles to facilitate parking of autonomous vehicles, a pallet cleaning system, and/or can be configured to store containers or other items.

26 Claims, 25 Drawing Sheets

(56) References Cited

U.S. PATENT DOCUMENTS

| | | |
|---|---|---|
| 6,851,921 B2 | 2/2005 | Haag |
| 11,763,616 B1* | 9/2023 | Morris .................... B60L 53/67 |
| | | 340/5.71 |
| 2002/0164234 A1* | 11/2002 | Haag ....................... E04H 6/422 |
| | | 414/277 |
| 2003/0069665 A1* | 4/2003 | Haag ....................... E04H 6/422 |
| | | 700/217 |
| 2018/0335781 A1* | 11/2018 | Chase .................. G08G 1/0145 |

OTHER PUBLICATIONS

Robotic Parking Systems, Inc. "The Biggest Ideas in Automatic Parking" dated Apr. 3, 2015; 24 pages.

\* cited by examiner

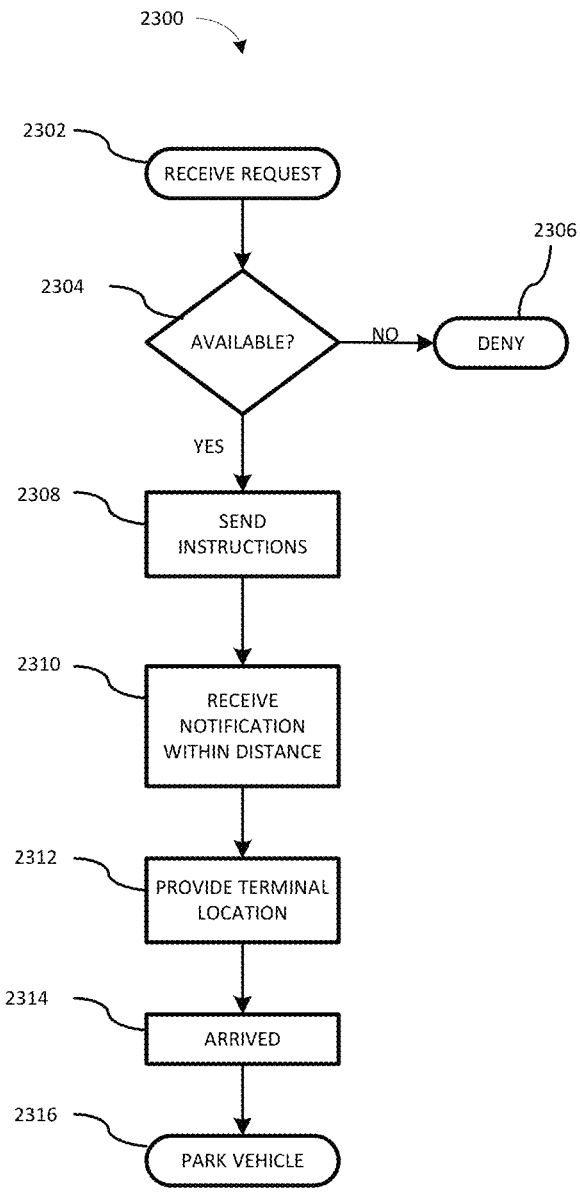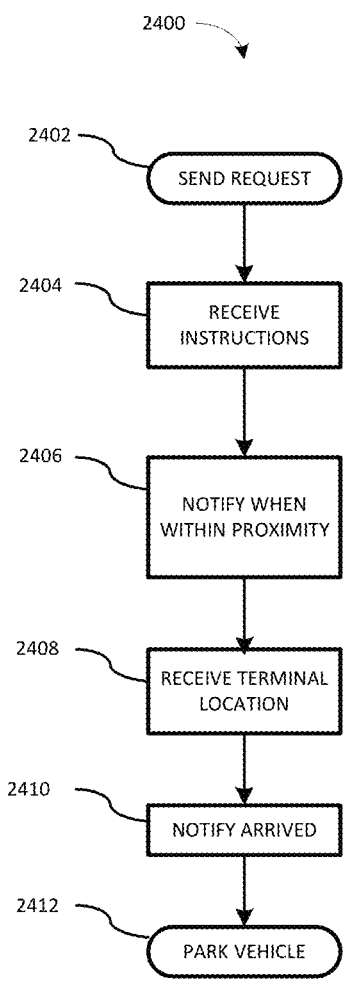
FIG. 23
FIG. 24

US 12,180,740 B2

AUTOMATED PARKING GARAGE

TECHNICAL FIELD

The present disclosure relates generally to automated parking garages.

BACKGROUND

Automated mechanical parking garage systems have been employed since the first half of the 1900's. Early automated parking garages utilized crane systems, conveyors, hydraulics, and pneumatics to transport and store vehicles within a parking structure. Recently, more advanced systems have been developed which include computer-controlled, specialized equipment for carrying vehicles to assigned parking spaces.

BRIEF DESCRIPTION OF THE DRAWINGS

The accompanying drawings incorporated herein and forming a part of the specification illustrate the example embodiments.

FIG. 23 is a block diagram that illustrates an example of a methodology employed by an automated parking garage for parking an autonomous vehicle.

FIG. 24 is a block diagram that illustrates an example of a methodology employed by an autonomous vehicle for parking in an automated parking garage.

OVERVIEW OF EXAMPLE EMBODIMENTS

Figure 1:
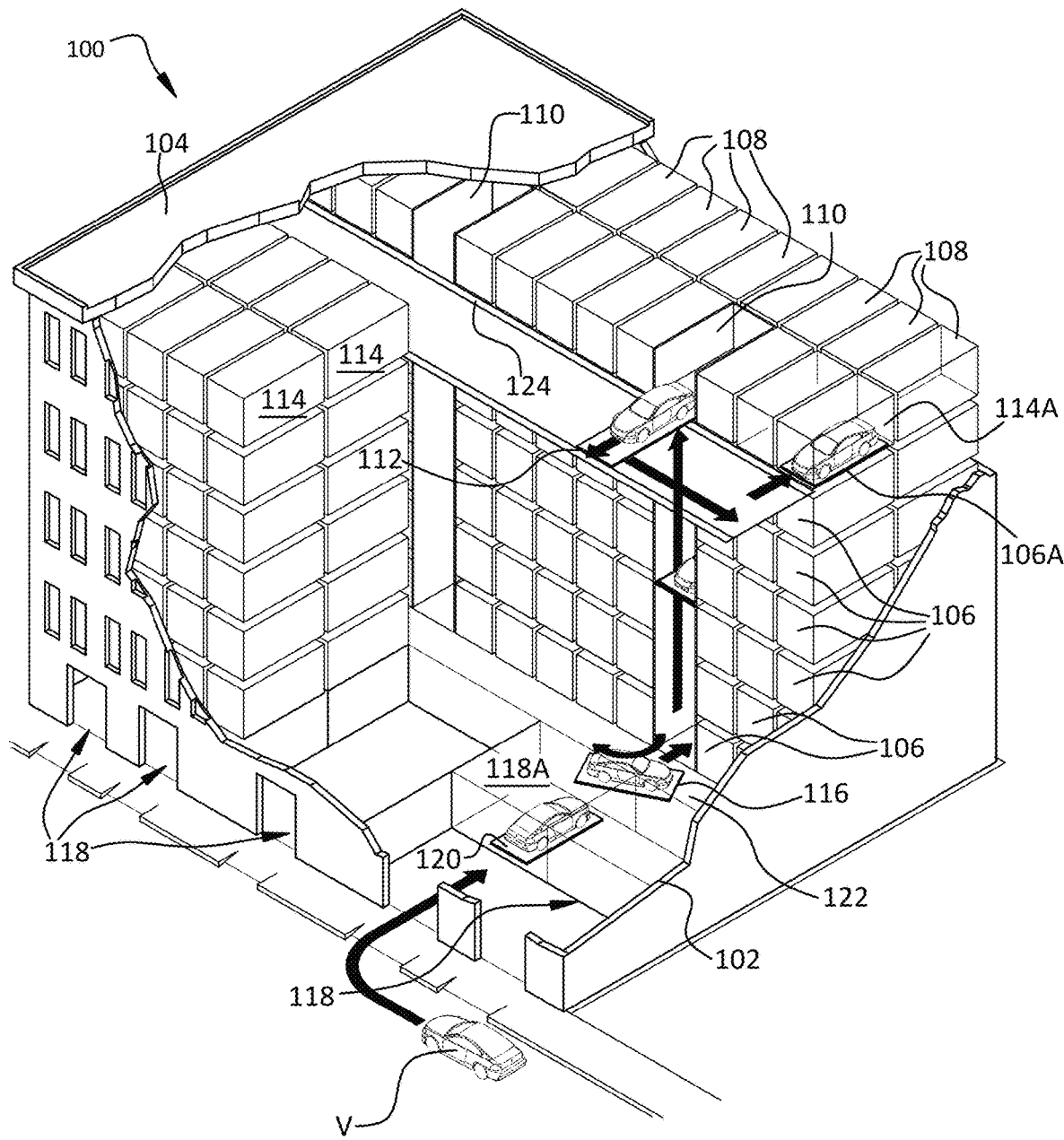
FIG. 1 is a cutaway view illustrating the interior of an automated parking garage upon which an example embodiment is implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an automated parking garage that employs a modular design. The modular design can improve the performance of the automated parking garage by expanding the number of terminals, vertical storage units and/or vertical lift carriers.

In accordance with an example embodiment, there is disclosed herein a control system for an automated parking garage that is coupled with the vertical lift and upper horizontal carriers. The control system is operable to move multiple items, such as vehicles, and/or storage containers independently by controlling the vertical lift and upper horizontal carriers so that they can operate concurrently or simultaneously.

In accordance with an example embodiment, there is disclosed herein an automated parking garage with at least one storage space comprising an electric vehicle charging station. The electric vehicle charging station is operable to charge electric vehicles.

In accordance with an example embodiment, there is disclosed herein an automated parking garage operable to communicate with autonomous (e.g., self-driving) vehicles. The automated parking garage can exchange communications with the autonomous vehicle to facilitate parking of the autonomous vehicle.

In accordance with an example embodiment, there is disclosed herein a pallet cleaning system for use with an automated parking garage. The pallet cleaning system can be employed to clean snow, slush, dirt, etc. from a pallet.

In accordance with an example embodiment, there is disclosed herein an automated parking garage that can be configured to store containers or other items. The containers can be stored in unused parking spaces.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is a cutaway view illustrating the interior of an automated parking garage 100 upon which an example embodiment is implemented. In the illustrated example, portions of the exterior wall 102 and roof 104 are removed in order to view the interior of the automated parking garage 100.

In the illustrated example, the automated parking garage 100 comprises a plurality of levels (or floors) 106 and a plurality of vertical storage units 108 (which are used for parking vehicles but can also be used to storage containers as will be described herein, thus storage units 108 may also be referred to herein as "parking spaces" or "storage spaces") on the plurality of levels 106. The automated parking garage 100 further comprises a vertical lift carrier ("VLC") 110, upper horizontal carriers ("HC") 112, and entry level carrier ("ELC") 116, and a plurality of entry exit stations (also referred to herein as "terminals") 118. In the illustrated example, the storage (or parking) units 108 have two storage spaces 114. As will be described. in more detail herein, infra, a storage spaces 114 can be parking space configured to parking cars and/or a storage space for storing containers. Thus, storage space 114 may also be referred to as a parking space.

In an example embodiment, the parking garage 100 has storage spaces 114 on both sides of the aisle 122 as illustrated in FIG. 1. Those skilled in the art can readily appreciate that in other embodiments there may be vertical storage units 108 located on one side of the aisle 122.

In the illustrated example, the vertical storage unit 108 has two storage spaces 114 per level 106. As those skilled in the art can readily appreciate, other embodiments may have a single storage space 114 or any other physically realizable number of storage spaces.

In operation, when a vehicle V enters an entry exit station 118A, the vehicle V drives onto a pallet 120 as illustrated by (1). In an example embodiment, the pallet is made of steel, however, those skilled in the art can readily appreciate that any suitable material can be employed for pallet 120. The pallet 120 with vehicle V thereon are transferred to entry level carrier 116 located in aisle 122.

The entry level carrier 116 is rotated one hundred and eighty degrees as illustrated at (2). Thus, when the vehicle V is later retrieved for departure, it is facing the entrance of a terminal 118 obviating the need for the driver to back out of the garage 100. In the illustrated example, the vehicle V is being parked on a different level than the terminal 118A. The vehicle is transferred to a vertical lift carrier 110 for transport to the appropriate level as illustrated b (3). Once at the appropriate level 106 106A in this example), the vehicle V is transferred to an upper horizontal carrier 112 as illustrated by (4). The upper horizontal carrier 112 is motorized and is operable to travel horizontally via rail 124. The upper horizontal carrier 112 transports the vehicle V adjacent to storage (parking) space 114A, and the vehicle is transferred into storage (parking) space 114A is illustrated by (5).

As those skilled in the art can readily appreciate, the number of levels 106, vertical storage units 108, vertical lift carriers 110, upper horizontal carriers 112 parking spaces 114, entry level carriers 116, and terminals 118 were merely selected for ease of illustration, and that the principles described herein can be applied to automated parking garages having any desired, physically realizable number of levels 106, vertical storage units 108, vertical lift carriers 110, upper horizontal carriers 112 parking spaces 114, entry level carriers 116, and terminals 118. Thus, the example embodiments described herein should not be construed as being limited to the configuration of the automated parking garage 100 illustrated in FIG. 1.

Figure 2:
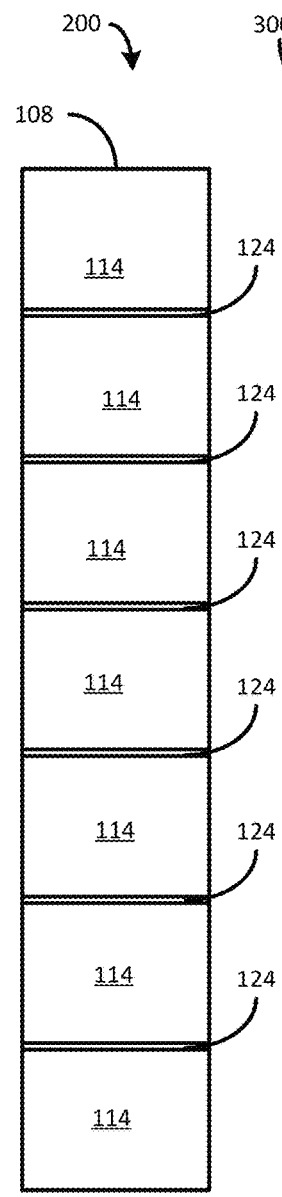
FIG. 2 is a block diagram illustrating a front view of a first module in accordance with an example embodiment.
Figure 3:
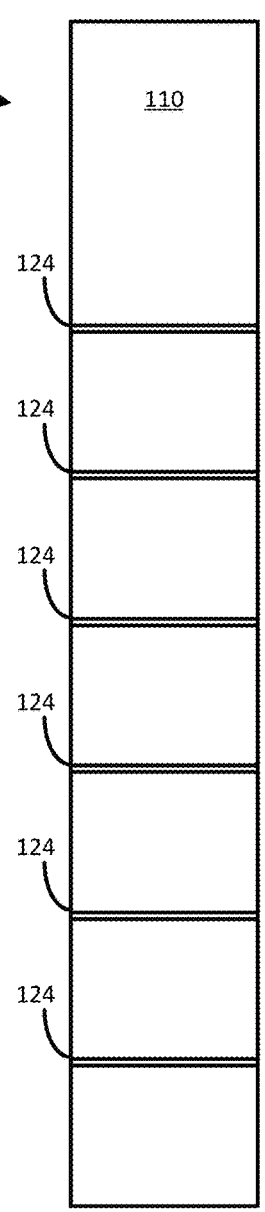
FIG. 3 is a block diagram illustrating a front view of a second module in accordance with an example embodiment.
Figure 4:
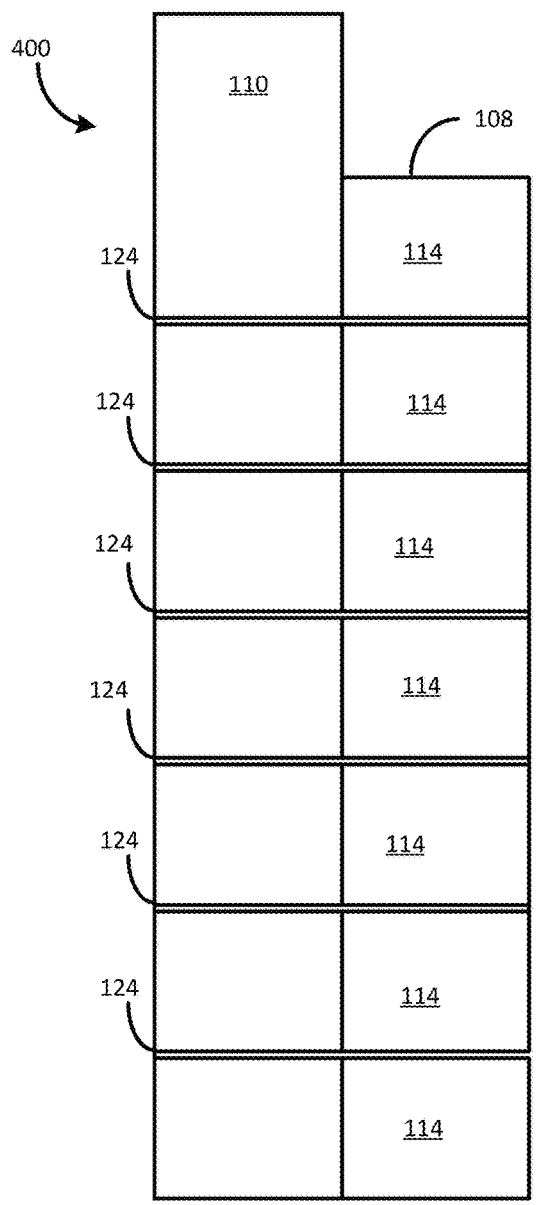
FIG. 4 is a block diagram illustrating a front view of a third module in accordance with an example embodiment.
Figure 5:
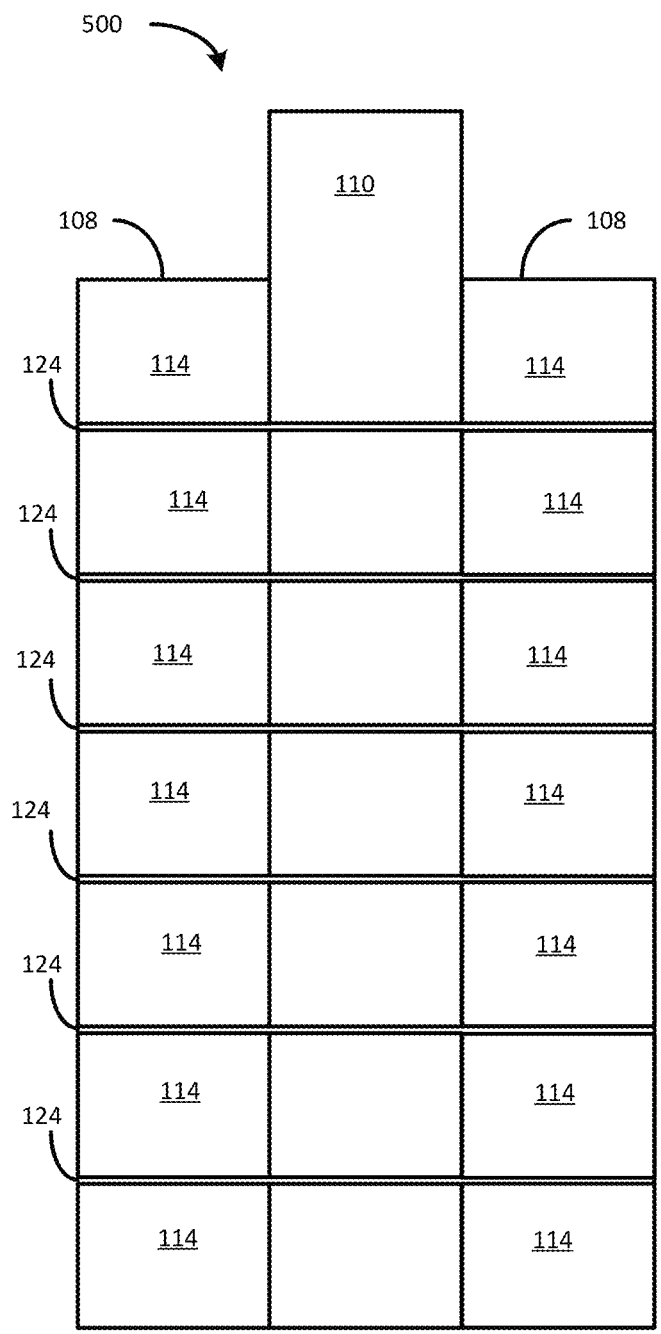
FIG. 5 is a block diagram illustrating a front view of a fourth module in accordance with an example embodiment.

In an example embodiment, the parking garage 100 comprises a plurality of modules. At least one module 200 of the modules is a vertical storage unit 108 with a plurality of storage spaces 114 as illustrated in FIG. 2. At least one module 300 of the plurality of modules comprises a vertical lift carrier 110 as illustrated in FIG. 3. Other example embodiments, the modules comprise a combination of a vertical lift carrier 110 and a vertical storage unit 108 as illustrated by module 400 in FIG. 4. or a module 500 that comprises a vertical lift carrier and a plurality of vertical storage units 108 as illustrated in FIG. 5. In the example illustrated in FIG. 5 there is a vertical storage unit 108 on each side of the vertical lift carrier 110, however, those skilled in the art can readily appreciate that in other embodiments both units could be located on either right or left side of the vertical lift carrier 110.

In addition to adding storage space 114 and vertical lift carriers 110, in an example embodiment, terminals 118 are added to handle the additional throughput provided by the additional storage space and vertical lift carriers. In particular embodiments, additional entry level carriers 116 and pallet stacking stations (not shown, see FIG. 6) are included. Additional upper horizontal carriers 112 can also be added.

In the examples illustrated in FIGS. 2-5, the modules 200, 300, 400, 500 respectively comprise rails 124 and modules 200, 300, 400, 500 are configured so that the rails 124 are aligned enabling the rails 124 to be coupled together so that upper horizontal carriers (not shown, see e.g., upper horizontal carrier 112 in FIG. 1 or FIG. 6) can travel among the modules 200, 300, 400, 500.

An aspect of these example embodiments is that an existing automated parking garage (e.g., automated parking garage 100) can be reconfigured without having to rebuild the garage by allowing vertical storage units 108 to be replaced by vertical lift carriers 110 and vice versa. For example, if more spaces are needed a vertical lift carrier 110 can be replaces by a vertical storage unit 108, or the peak throughput can be improved by replacing a vertical storage unit 108 with a vertical lift carrier 110.

Another aspect of the example embodiments described herein is the modularity and scalability can also facilitate adding additional parking spaces 114 and/or vertical lift carriers onto existing structures, improving both capacity and throughput.

For example, where one module that combines a terminal 118, a vertical lift carrier 110, an entry level carrier, 116 and a plurality of vertical storage units 108 can transport forty cars per hour, then two modules can transport eighty cars per hour, three modules can transport one hundred twenty cars per hour, and ten modules can transport four hundred cars per hour. The increase in capacity and throughput is linear. This can provide a benefit over a stacker and crane system where after more than three or four cranes the cranes begin to hinder each other or systems with elevators only at the ends of a level which limits traffic capacity, especially at peak times.

Figure 6:
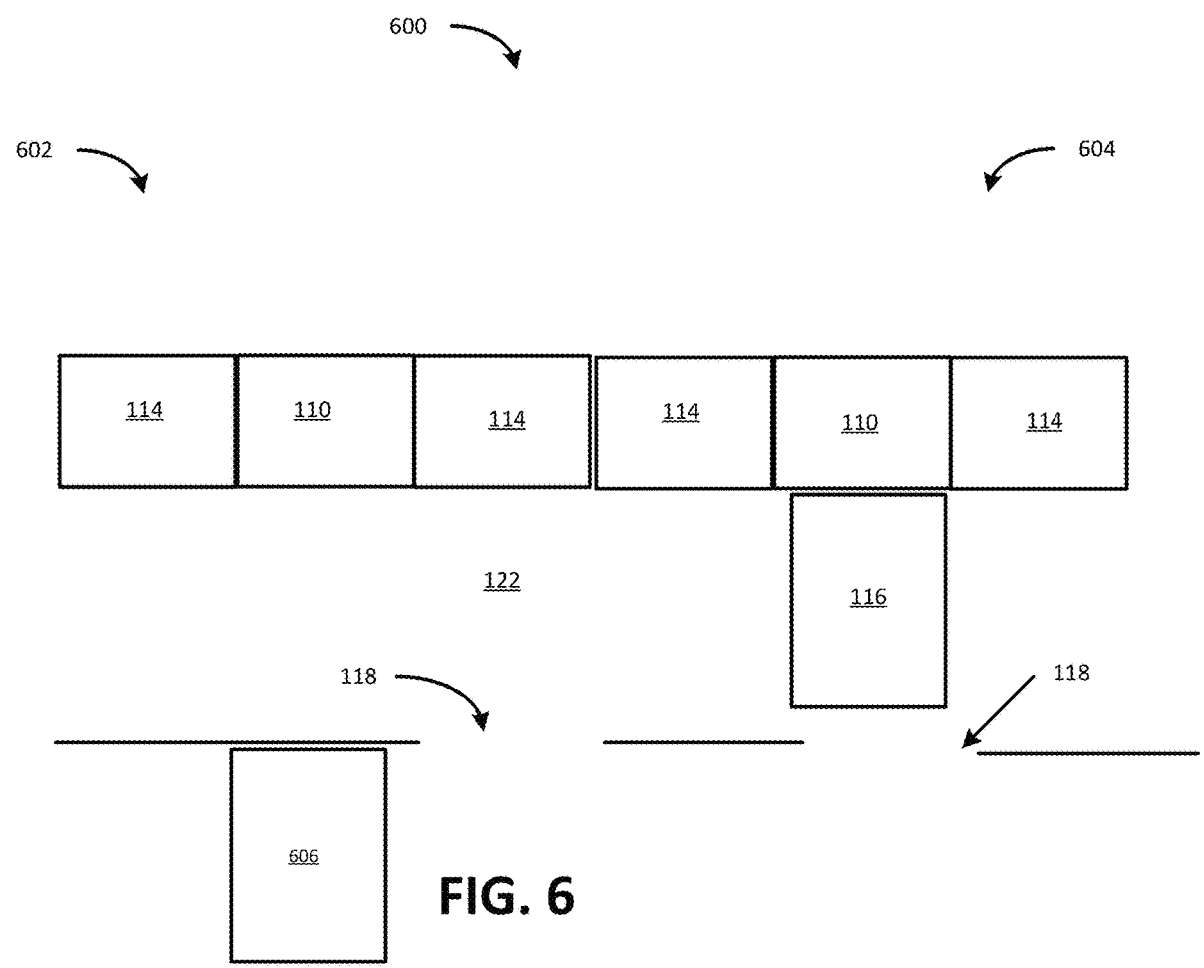
FIG. 6 is a perspective view illustrating an example of a section of a parking garage that comprises a plurality of modules.

FIG. 6 is a block diagram illustrating an example of a module 600 of an automated parking garage 100 that comprises a plurality of modules 602, 604 (on one side of aisle the 122 although those skilled in the art should readily appreciate there can be modules on both sides of the aisle 122) configured like module 500 in FIG. 5 that further comprise additional entry level carriers 116 and terminals 118 that can be implemented with automated parking garage 100 (FIG. 1).

In the illustrated example, which the applicant has determined provide satisfactory performance, there is a ratio of one terminal 118 per one LC 116 to one VLC 110. In addition, there is a ratio of one pallet stacker with pallet lift 606 for every two terminals 118. In particular embodiments, the number of upper horizontal carriers 112 is dependent on the length of the garage, such as for example for one hundred feet at least two carriers, and at least one additional carrier for each additional one hundred feet.

Figure 7:
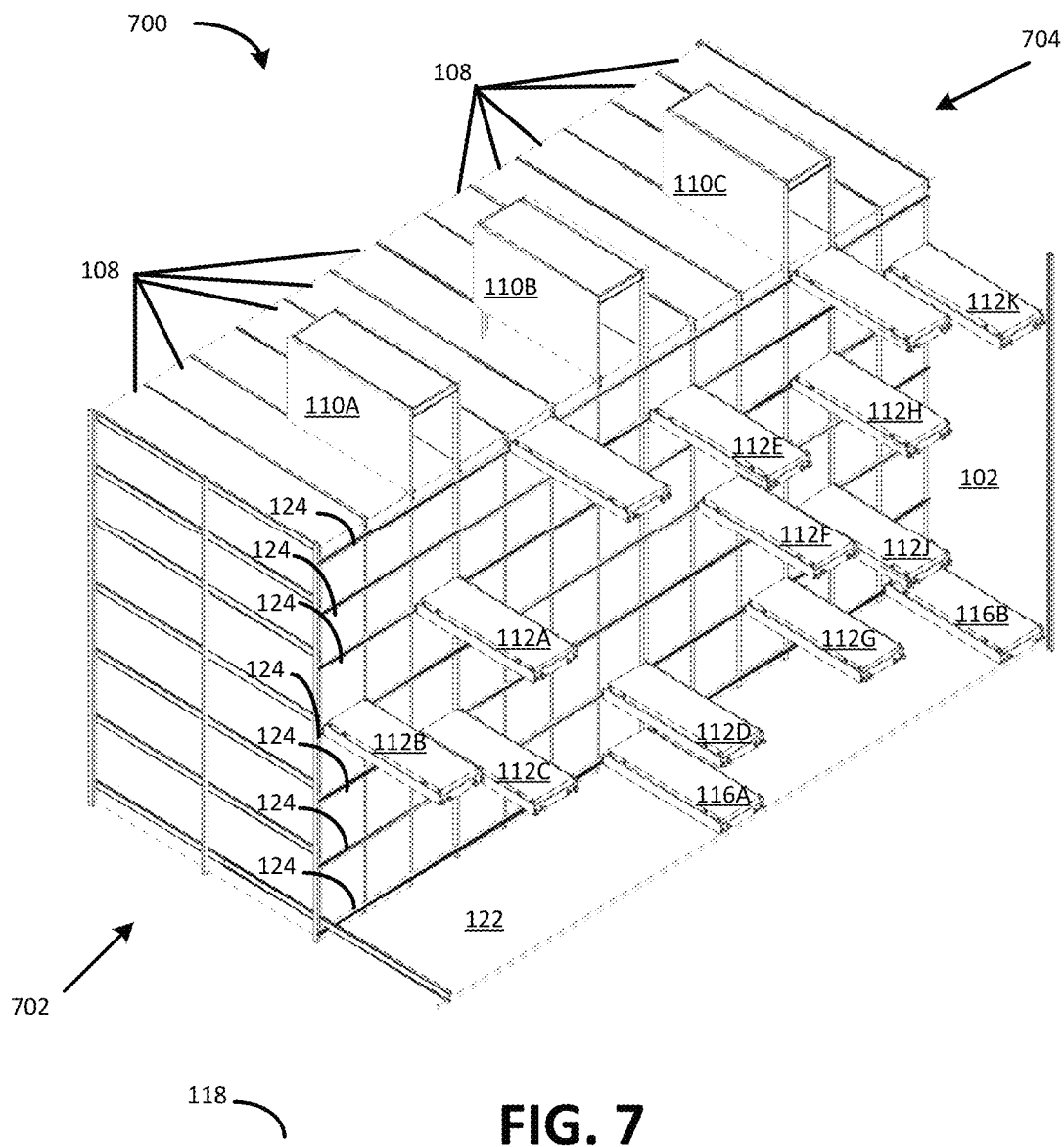
FIG. 7 is a block diagram illustrating an example of a plurality of modules that further comprise additional entry level carriers and terminals where multiple items can be moved at the same time.

FIG. 7 is a block diagram illustrating a second example of a section 700 of an automated parking garage 100 that comprises a plurality of modules that further comprise additional entry level carriers 116 and terminals 118. In this example there are two entry level carriers 116 and two upper horizontal modules 112 for an arrangement of three vertical lift carriers 110 and ten vertical storage units 108. In this example, there are two vertical storage units 108 on each end 702, 704 of the section 700 and three vertical storage units 108 between each vertical lift carrier 110 to further illustrate the flexibility of the modular configuration described herein.

Figure 8:
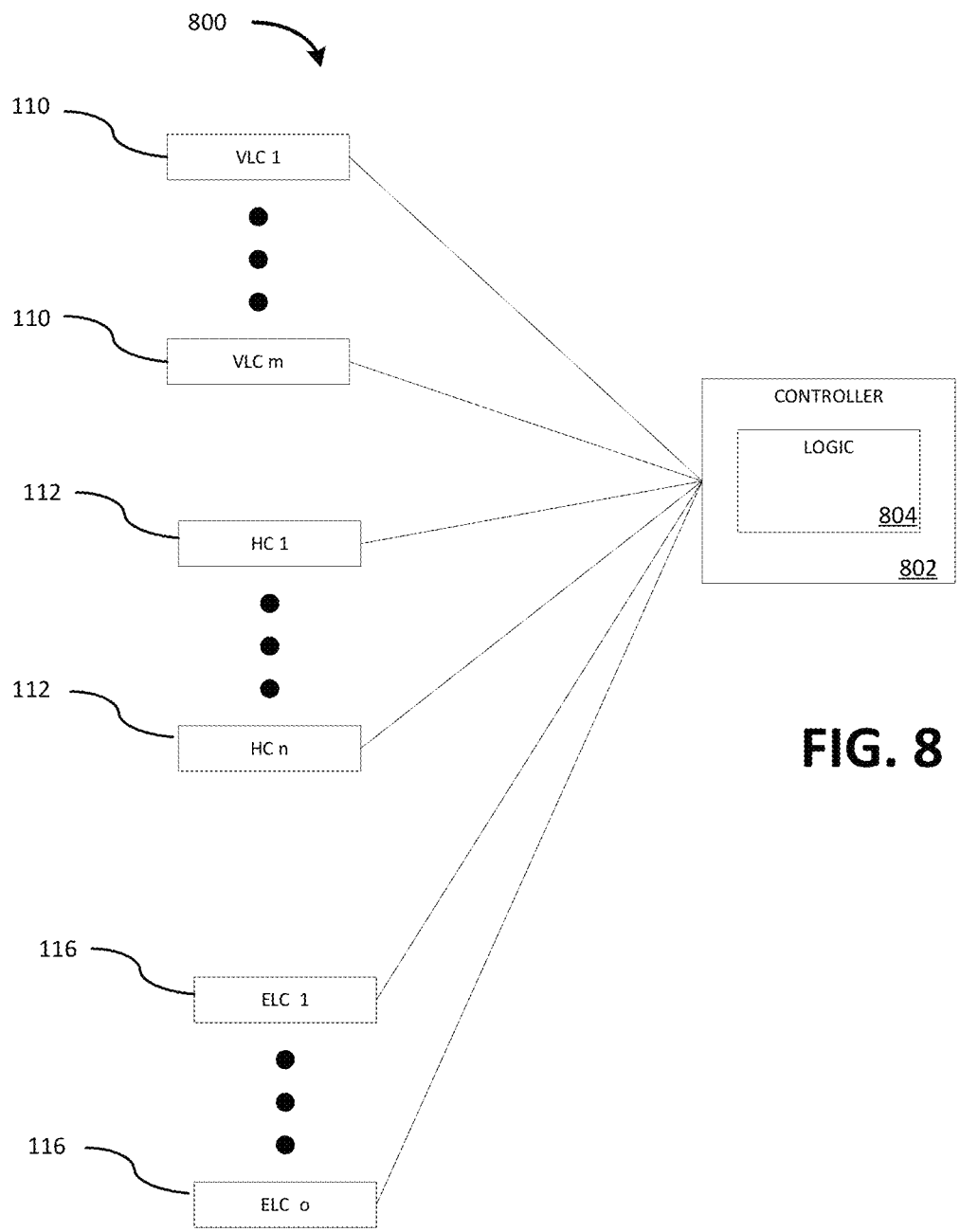
FIG. 8 is a block diagram illustrating an example of a system for operating an automated parking garage in accordance with an example embodiment.

FIG. 8 is a block diagram illustrating an example of a system 800 for operating an automated parking garage (e.g., automated parking garage 100) in accordance with an example embodiment. The system comprises a plurality of vertical lift carriers (VLC 1 . . . VLC m, where m is an integer greater than 1) 110. upper horizontal carriers (HC 1 . . . HC n, where n is an integer greater than 1) 112, and a plurality of entry level carriers (ELC 1 . . . ELC o, where o is an integer greater than 1) 116 that are coupled with a controller 802. As will be described herein, the controller 802 is operable to control the movement of the plurality of vertical lift carriers 110, upper horizontal carriers 112, and entry level carriers 116 so that a plurality of vehicles can be moved concurrently or simultaneously. The control 802 comprises logic 804 that performs the functionality described herein. "Logic," as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully implemented in software that is embodied on a tangible, non-transitory computer-readable medium that performs the described functionality when executed by processor.

In an example embodiment, the controller 802 is operable to employ a first vertical lift carrier selected from the plurality of vertical lift carriers 110 and a first upper horizontal carrier selected from the plurality of upper horizontal carriers 112 to transport a first vehicle from a first source to a first destination (e.g., parking space 114A in FIG. 1). The controller 802 is further operable to employ a second vertical lift carrier selected from the plurality of vertical lift carriers 110 and a second upper horizontal carrier 112 to transport a second vehicle selected from a second source to a second destination (e.g., another parking space 114 or ELC 116) while the first vehicle is in transit from the first source to the first destination. In an example embodiment, the controller 802 is operable to employ a plurality of vertical lift carriers selected from the plurality vertical lift carriers 110 and a plurality of upper horizontal carriers selected from the plurality of upper horizontal carriers 112 to concurrently transport a plurality of vehicles from a plurality of sources to a plurality of destinations while the first vehicle is in transit from the first source to the first destination and the second vehicle is in transit from the second source to the second destination, which can be scaled to any physically realizable number of operations.

In an example embodiment, the controller is operable to wait before transporting the second vehicle on a carrier selected from the second vertical life carrier and the second upper horizontal carrier responsive to determining the selected carrier is currently transporting the first vehicle. For example, if upper horizontal carrier 112 in FIG. 1 is unavailable to pick up a vehicle at slot 114A, (FIG. 1) and no other upper horizontal carrier 112 is available to transport the vehicle from parking space 114A, the controller will wait until an upper horizontal carrier is available. Similarly, if the upper horizontal is blocked from moving to a vertical lift carrier 110 (for example another upper horizontal carrier 112 is transferring a vehicle into or out of the parking space 114 adjacent to parking space 114A, the controller 802 will wait until an upper horizontal carrier 112 can access parking space 114A.

Alternatively, if the nearest upper horizontal carrier 112 to a parking space 114 is already transporting another vehicle, if another upper horizontal carrier 112 can access the parking space 114, the controller 802 selects that upper horizontal carrier 112 to transport the vehicle. Similarly, if the nearest vertical lift carrier 110 is unavailable (e.g., transporting another vehicle), the upper horizontal carrier and/or entry level carrier 116 transporting the vehicle will continue to the next available vertical lift carrier 110. In still yet another example embodiment, if there is no upper horizontal carrier 112 or entry level carrier 116 available at the destination level to transport the vehicle to the desired location (for example a parking spot 114 or a terminal 118), the controller 802 can either wait until the upper horizontal carrier 112 or entry level carrier 116 is available or reroute the vehicle to another vertical lift carrier 110 that is able to access the desired destination.

For example, referring to FIG. 7, if a vehicle upper horizontal carrier 112B is to transport a car to the right of upper horizontal carrier 112F, either the controller can wait until upper horizontal carrier 112F is out of the way, or wait until upper horizontal carrier 112F is available, reroute the vehicle through upper horizontal carrier 112F.

As another example, referring to FIG. 7, if a vehicle on upper horizontal carrier 112B was being routed to vertical lift carrier 110C, which is currently blocked by upper horizontal carrier 112H, the controller will either wait until upper horizontal carrier is out of the way or reroute the vehicle to one of vertical lift carriers 110A or B.

As still yet another example, referring to FIG. 7, if a vehicle on upper horizontal carrier is to deliver a vehicle to a terminal near entry level carrier 116B, if the terminal is blocked by entry level carrier 116B and/or vertical lift carrier is unavailable, the controller 802 wait until entry level carrier 116B and/or vertical lift carrier 110C is available. Alternatively, if another entry level carrier LC 116A in this example, can transport the vehicle to the destination terminal, upper horizontal carrier 112B can transport the vehicle to vertical lift carrier 110B, which delivers the vehicle to entry level carrier 116A.

As those skilled in the art can readily appreciate from the above examples, any number of vertical lift carriers 110A-C, upper horizontal carriers 112A-K, and/or entry level carriers 116A-B can be operating concurrently or simultaneously. Therefore, for the example illustrated in FIG. 7, as there are two entry level carriers 116, ten upper horizontal carriers 112, and three vertical lift carriers 110, there can be up fifteen movements occurring at the same time.

Figure 9:
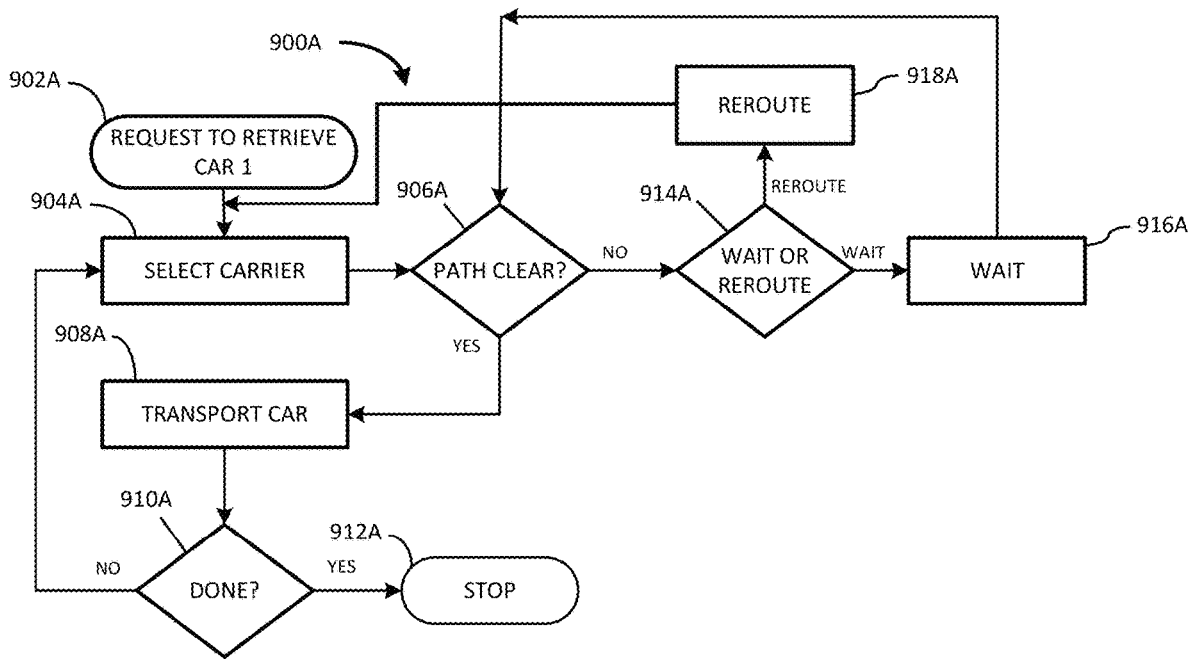
FIG. 9 is a block diagram illustrating an example of a method of operating an automated parking garage that allows for the storage and/or retrieval of multiple vehicles to occur concurrently or simultaneously.
Figure 9:
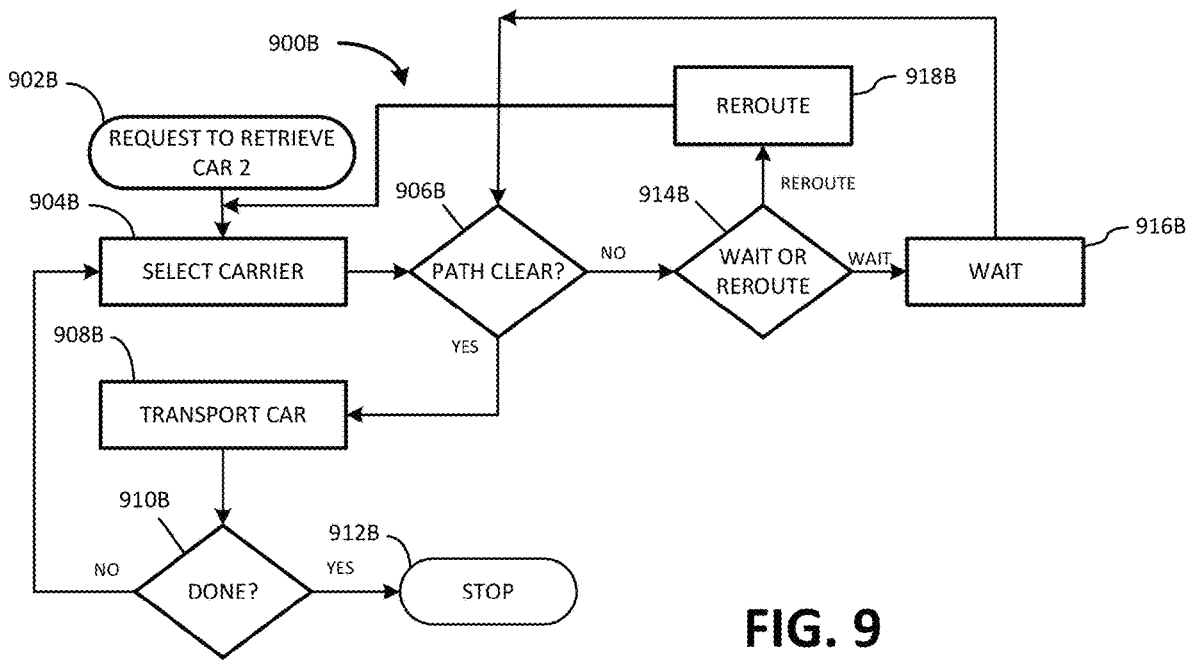

In view of the foregoing structural and functional features described above, a methodology 900 in accordance with an example embodiment will be better appreciated with reference to FIG. 9. While, for purposes of simplicity of explanation, the methodology 900 of FIG. 9 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement an example embodiment. The methodology 900 described herein is suitably adapted to be implemented in hardware, software when executed by a processor, or a combination thereof. In an example embodiment, the methodology 900 is implemented on a computer system, an example of which will be described herein infra. A controller, such as for example controller 802 in FIG. 8, can implement methodology 900, and as will be described herein, multiple instances of the methodology, illustrated by 900A and 900B, can be performed simultaneously or concurrently. FIG. 9 illustrates two instances 900A, 900B of methodology are illustrated, however those skilled in the art should readily appreciate that the number of instances illustrated was selected for ease of illustration and that the example embodiments described herein can implement any physically realizable number of instances simultaneously or concurrently.

The first instances of methodology 900, methodology 900A, begins when a request is made to retrieve a first vehicle (Car 1) as illustrated at 902A. The request can be to move the vehicle from a terminal 118 to a parking space 114, from a parking space 114 to an entry level carrier 116, between parking spaces 114, or from anywhere in the garage to another location.

At 904A a carrier is selected to transport Car 1. The carrier can be an entry level carrier 116, vertical lift carrier 110, or a horizontal carrier 112. In an example embodiment, a route is determined for Car 1 to move from its current (or source) location to a destination. If there is a problem with a route (e.g., an entry level carrier 116, vertical lift carrier 110, and/or horizontal carrier 112 is unavailable or the route conflicts with the route of another vehicle being moved in the garage 100, an alternate route is determined.

At 906A, a determination is made whether the carrier can transport Car 1 to the destination. The destination can be the next carrier on a route to a final destination, or the final destination (e.g., a parking space 114 or terminal 118).

If, at 906A, a determination is made that the path is clear (YES), the car is transported on the carrier as indicated by 908A. After the transport is complete, at 910A, a determination is made whether Car 1 has reached its final destination. If, at 910A, a determination is made the Car 1 has reached its final destination (YES), methodology 900A is completed as indicated by 912A. Otherwise (NO), the next carrier is selected at 904A.

If, at 906A, a determination is made that the path to transport car 1 is not clear (NO), at 914A a decision is made whether to Wait or Reroute Car 1 to another carrier. A decision to wait can occur when there is no other carrier available to route Car 1 to its destination. For example, if a horizontal carrier 112 is attempting to transport Car 1 to a parking space 114 and another horizontal carrier 112 is blocking the path to the parking space, the decision at 9146 can be to wait until the path is clear. However, if there is an alternate route, (e.g., route to a first vertical lift carrier 110, to a horizontal carrier 112 on another level 106 that transports Car 1 to a second vertical lift carrier 110 on the other side of the blockage, to another horizontal carrier 112 on the same level 116 that can transport Car 1 to its destination (e.g., a parking space 114 or a terminal 118) then the decision at 914A can be to reroute the vehicle. If the decision at 914A to wait (WAIT), at 916A, the methodology 900A waits. The method waits until it is determined at 906A that the path is clear or until, at 914A, another route is available.

If, at 914A, a determination is made that another path is available (REROUTE), at 918A, Car 1 is rerouted to another path to the destination. After the new route is determined, at 904A a carrier is selected and, at 906A, a determination is made whether the path is clear. If the path is not clear then any of acts 914A, 916A, 918A, 904A, and/or 906A can be repeated until Car 1 can be transported.

The second instances of methodology 900, methodology 900B, begins when a request is made to retrieve a second vehicle (Car 2) as illustrated at 902B. The request can be to move the vehicle from a terminal 118 to a parking space 114, from a parking space 114 to an entry level carrier 116, between parking spaces 114, or from anywhere in the garage to another location. The second request, at 902B, can be received at the same time as the first request, at 900A, or can be received at any time while methodology 900A is being performed.

At 904B a carrier is selected to transport Car 2. The carrier can be an entry level carrier 116, vertical lift carrier 110, or a horizontal carrier 112. In an example embodiment, a route is determined for Car 2 to move from its current (or source) location to a destination. If there is a problem with a route (e.g., an entry level carrier 116, vertical lift carrier 110, and/or horizontal carrier 112 is unavailable or the route conflicts with the route of another vehicle being moved in the garage 100, an alternate route is determined.

At 906B, a determination is made whether the carrier can transport Car 2 to the destination. The destination can be the next carrier on a route to a final destination, or the final destination (e.g., a parking space 114 or terminal 118).

If, at 906B, a determination is made that the path is clear (YES), the car is transported on the carrier as indicated by 908B. After the transport is complete, at 910B, a determination is made whether Car 2 has reached its final destination. If, at 910B, a determination is made the Car 2 has reached its final destination (YES), methodology 900B is completed as indicated by 912B. Otherwise (NO), the next carrier is selected at 904B.

If, at 906B, a determination is made that the path to transport Car 2 is not clear (NO), at 914B a decision is made whether to Wait or Reroute Car 2 to another carrier. A decision to wait can occur when there is no other carrier available to route Car 2 to its destination. For example, if a horizontal carrier 112 is attempting to transport Car 2 to a parking space 114 and another horizontal carrier 112 is blocking the path to the parking space, the decision at 9146 can be to wait until the path is clear. However, if there is an alternate route, (e.g., route to a first vertical lift carrier 110, to a horizontal carrier 112 on another level 106 that transports Car 2 to a second vertical lift carrier 110 on the other side of the blockage, to another horizontal carrier 112 on the same level 116 that can transport Car 2 to its destination (e.g., a parking space 114 or a terminal 118) then the decision at 914B can be to reroute the vehicle. If the decision at 914B to wait (WAIT), at 916B, the methodology 900B waits. The method waits until it is determined at 906B that the path is clear or until, at 914B, another route is available.

If, at 914B, a determination is made that another path is available (REROUTE), at 918B, Car 2 is rerouted to another path to the destination. After the new route is determined, at 904B a carrier is selected and, at 906B, a determination is made whether the path is clear. If the path is not clear then any of acts 914B, 916B, 918B, 904B, and/or 906B can be repeated until Car 2 can be transported.[

As those skilled in the art can readily appreciate, any of acts 902A, 904A, 906A, 908A, 910A, 912A, 914A, 916A, 918A can be performed while any of acts 9026, 904B, 906B, 908B, 910B, 912B, 914B, 916B, 918B are being performed. Thus, a plurality of vertical lift carriers 110, a plurality of horizontal carriers 112, and/or a plurality of entry level carriers 116 can be operating simultaneously or concurrently.

In an example embodiment, once any of vertical lift carriers 110, upper horizontal carriers 112, entry level carriers 116, or terminals 118 has completed a particular transport, motion, and/or function, it is immediately free to take on another task. This increases system flexibility and throughput. For example, this improves throughput over systems that employ a single carrier to transport a vehicle from the terminal to its final destination, and then returns to the terminal to service the next vehicle, whereas the example embodiments described herein allow an entry level carrier 116 to service the next car waiting at a terminal 118 as soon as the car is handed off to a vertical lift carrier 110. As those skilled in the art can readily appreciate, this can improve throughput during rush hour when there is a high volume of incoming or outgoing vehicles. Thus, systems that must wait for the carrier to return to its origin before servicing the next vehicle can never match the throughput of the example embodiments described herein.

Figure 10:
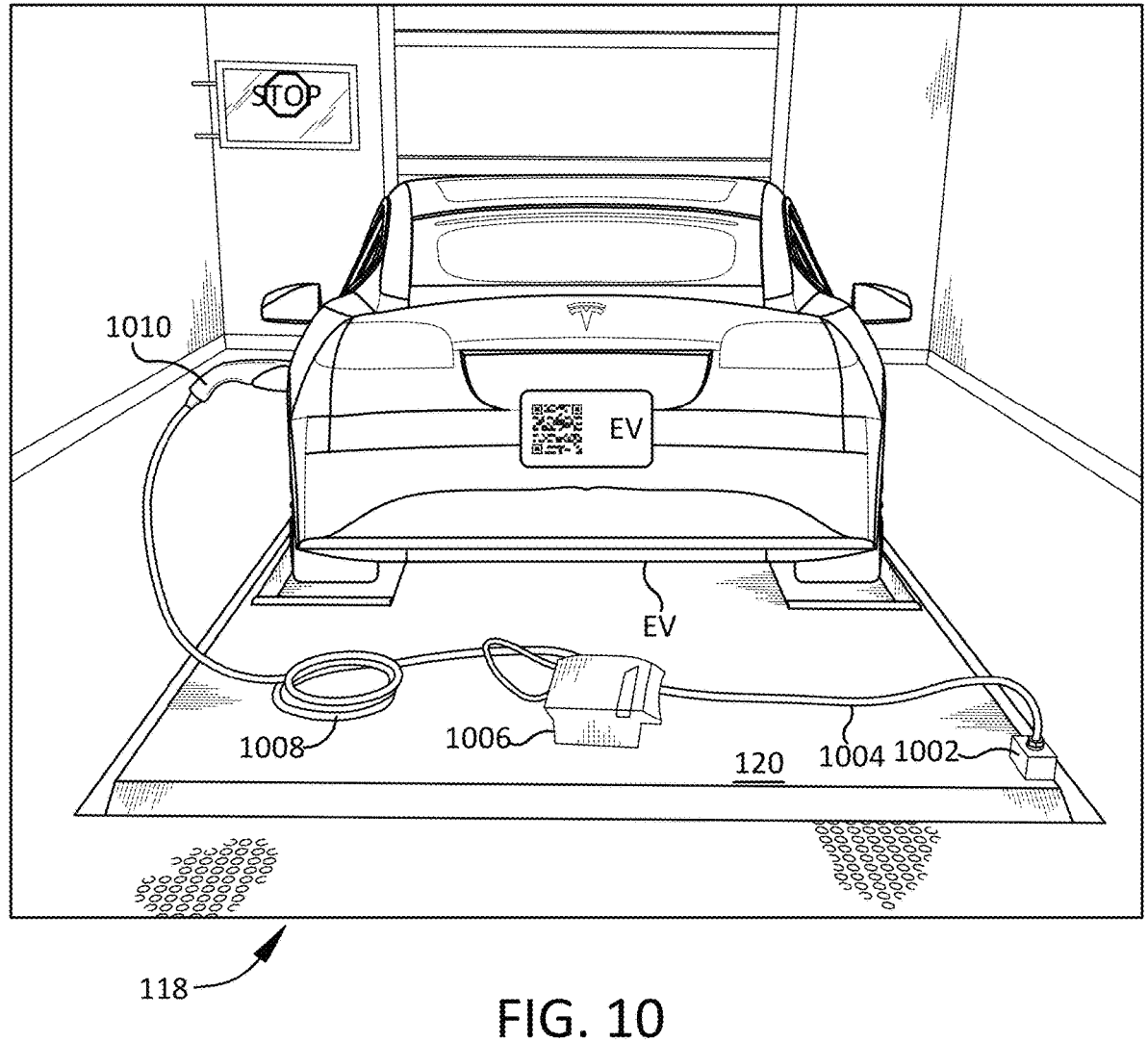
FIG. 10 illustrates an example of a terminal configured for preparing an electric vehicle for charging at an electric vehicle charging station.

FIGS. 10-18 illustrate an example of an automated parking garage 100 with a parking space 114 equipped with an electric vehicle ("EV") charging station 1000. FIG. 10 illustrates a simplified example of a terminal 118 configured for preparing an electric vehicle for charging at an electric vehicle charging station 1000. In an example embodiment, electric vehicles are moved out of a parking space capable of providing electric vehicle charging after their charging is completed. The vehicle can be fully charged, or in particular embodiments, a customer can pay for a predetermined amount of charging (e.g., one hour, two hours) and/or specify charging parameters, such as for example, charging voltage, for example standard 120 volt(V) home outlets (Level 1), 208-240V outlets like those used by a household dryer (Level 2), or dedicated 480V+ public fast chargers (DC Fast Charging). An employee of the automated parking facility places the appropriate plug 1002, first cable 1004, charging unit 1006, second cable 1008, and receptacle 1010 (which can be one unit or separate pieces) onto the pallet 120 where the electric vehicle EV enters into any of the terminals 118, While in the terminal 118, no charge is flowing. As will be described herein, infra, charging occurs at the charging station 1000 (see e.g., FIG. 16). Moreover, no charge is flowing before the electric vehicle is moved to a parking spot somewhere else in the garage that is equipped with an electric vehicle charging station 1000, Once the EV returned/retrieved by customer and placed into terminal 118, an employee disconnects the receptacle 1010 from the EV and removes the plug 1002, first cable 1004, charging unit 1006, second cable 1008, and receptacle 1010 from the pallet 120 prior to the customer driving off. As those skilled in the art can readily appreciate, because electric vehicles are moved out of the parking space equipped with electric vehicle charging stations 1000 after charging, the parking spaces with electric vehicle charging stations 1000 capable of charging multiple cars that are parked in the automated parking garage 100, which can reduce the number of the parking spaces with electric vehicle charging stations 1000 that are needed to support electric vehicle charging. For example, a small number of parking spaces 114 are equipped with electric vehicle charging stations 1000. As additional electric charging stations are needed, additional parking spaces 114 can be provided with electric vehicle charging stations 1000.

As will be illustrated in more detail herein, the electric vehicle charging station 1000 comprises contacts coupled with a switch that is coupled with a power source. The switch is a normally-off switch that is configured to turn on when pallet 120 is in the proper position. In an example embodiment, a plug unit is mounted onto the pallet which engages a lever of the switch when the pallet 120 is in the proper position, which causes the switch to turn and provide power to contacts mounted in the parking space. The bottom of the plug unit comprises contacts that engage the contacts in the parking space. The power is routed to the electric vehicle via the plug unit.

Figure 11:
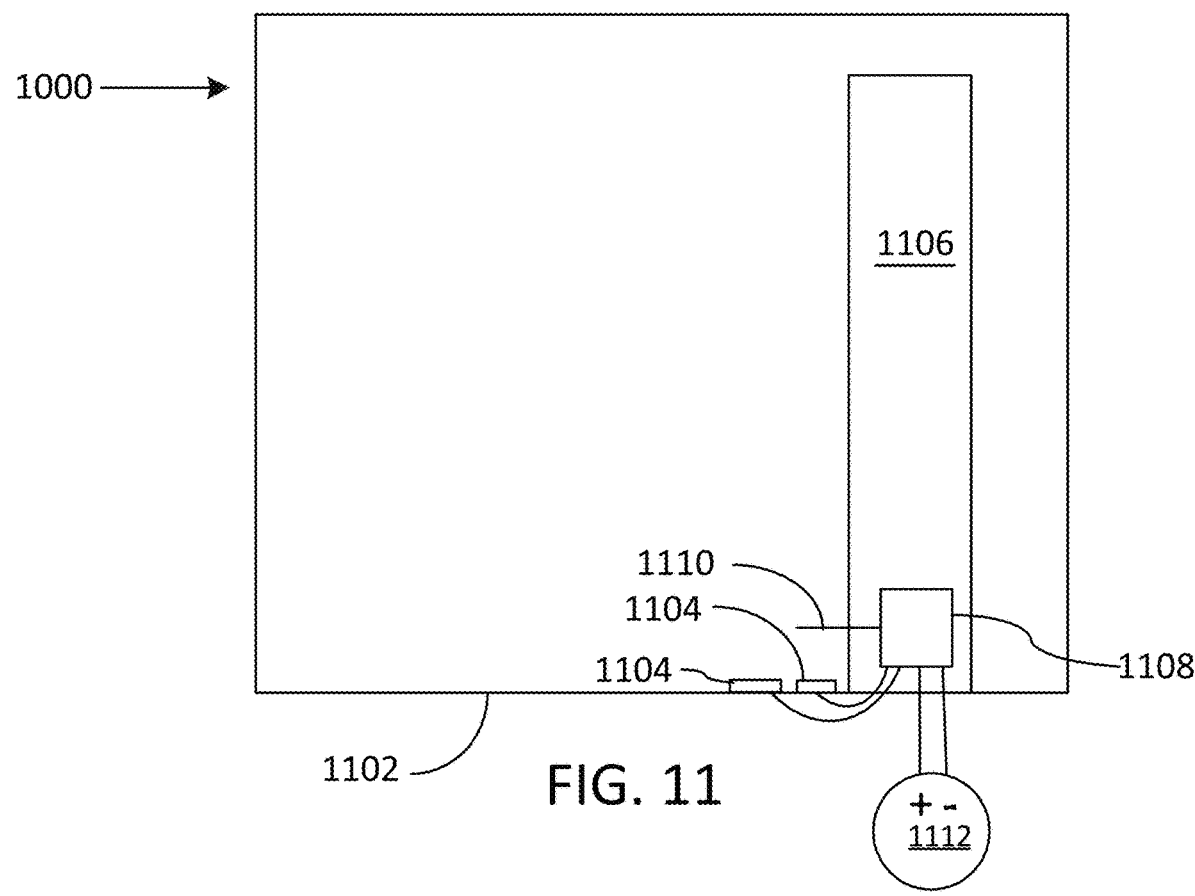
FIG. 11 is a block diagram illustrating a front view of a parking space equipped with an electric vehicle charging station.

FIG. 11 is a block diagram illustrating a front view of a parking space equipped with an electric vehicle charging station 1000. Contacts 1104 for providing electricity from a source of electricity 1112 are mounted on the bottom surface 1102 of the parking space equipped with an electric vehicle charging station 1000. A mounting panel 1106 is provided for mounting the switch 1108. The contacts 1104 are coupled with a source of electricity 1112 via the switch 1108. In an example embodiment, the source of electricity 1112 is capable of providing electrical power at different levels (e.g., level 1 or level 2, (and in particular embodiments level 3). In an example embodiment, switch 1108 is a limit switch with a lever 1110 operable to turn the switch 1108 on and off. As will be described in more detail herein, infra, when a pallet 120 is in a predetermined position, the lever 1110 of switch 1108 will move to the on position and power is provided to the contacts 1104 from the power source 1112. In an example embodiment, the lever 1110 is spring biased so that it returns to the OFF position when the lever 1110 is not engaged with a plug 1002 as will be described in FIG. 16 infra.

Figure 12:
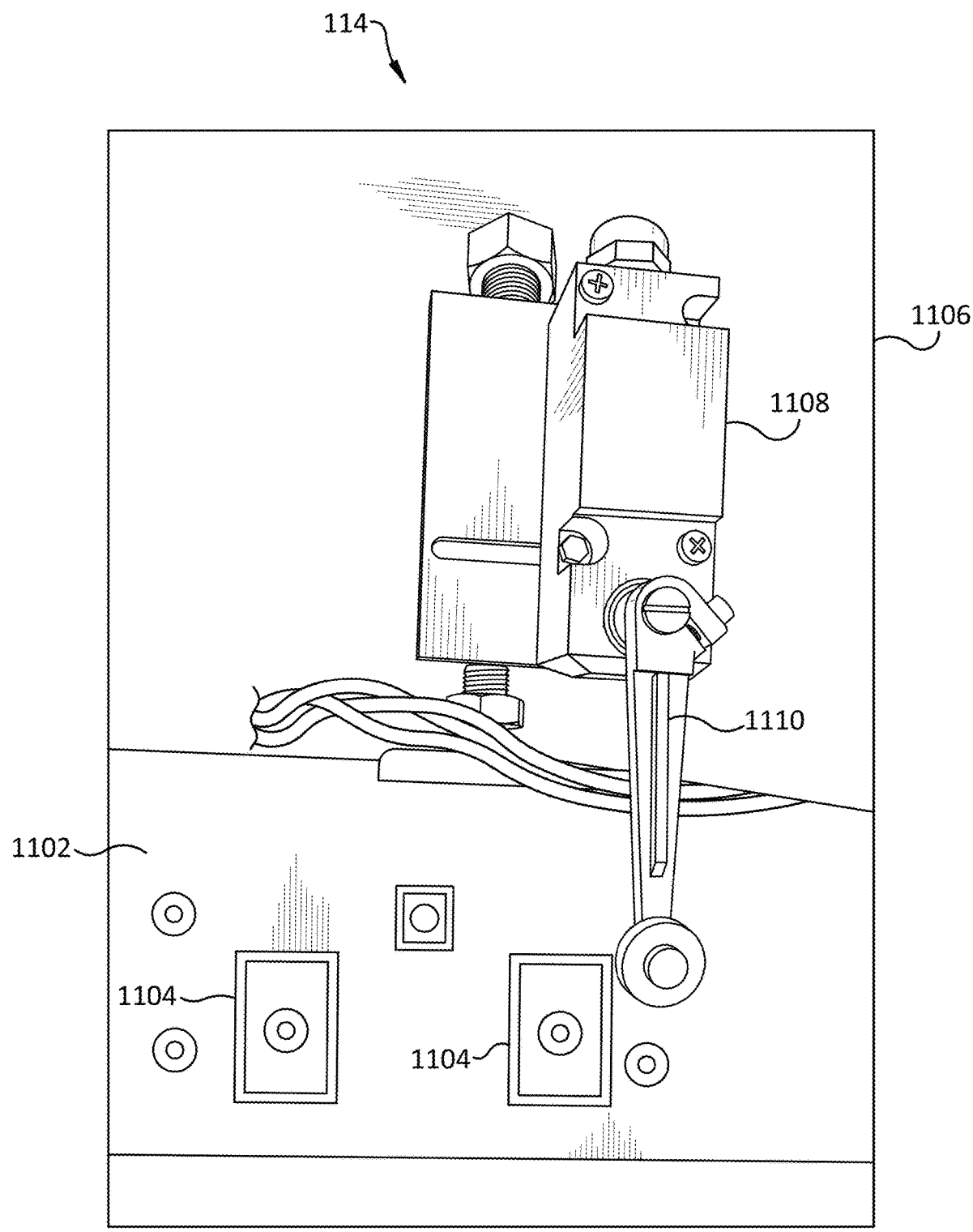
FIG. 12 illustrates a top view of a section of a parking space equipped with an electric vehicle charging station.

FIG. 12 illustrates a top view of a section of a parking space equipped with an electric vehicle charging station 1000. The illustrated section includes switch 1110 and an adjacent area of the bottom surface 1102 of the parking space equipped with an electric vehicle charging station 1000. On the bottom surface 1102 are contacts 1104. As will be described herein infra, contacts 1104 are coupled via switch 1110 to a power source. In an example embodiment, when a pallet 120 is in the proper position, the plug 1002 engages lever 1110 which causes the switch to provide power to contacts 1104. When there is no pallet 120 in the parking space equipped with an electric vehicle charging station 1000, or if the pallet is not configured to charge electric vehicles, the lever 1110 is in the position illustrated in FIG. 12 and the power source is disconnected from contacts 1104. In an example embodiment, the lever 1110 is spring biased so that it returns to the position illustrated FIG. 12 when not engaged with the plug 1102.

Figure 13:
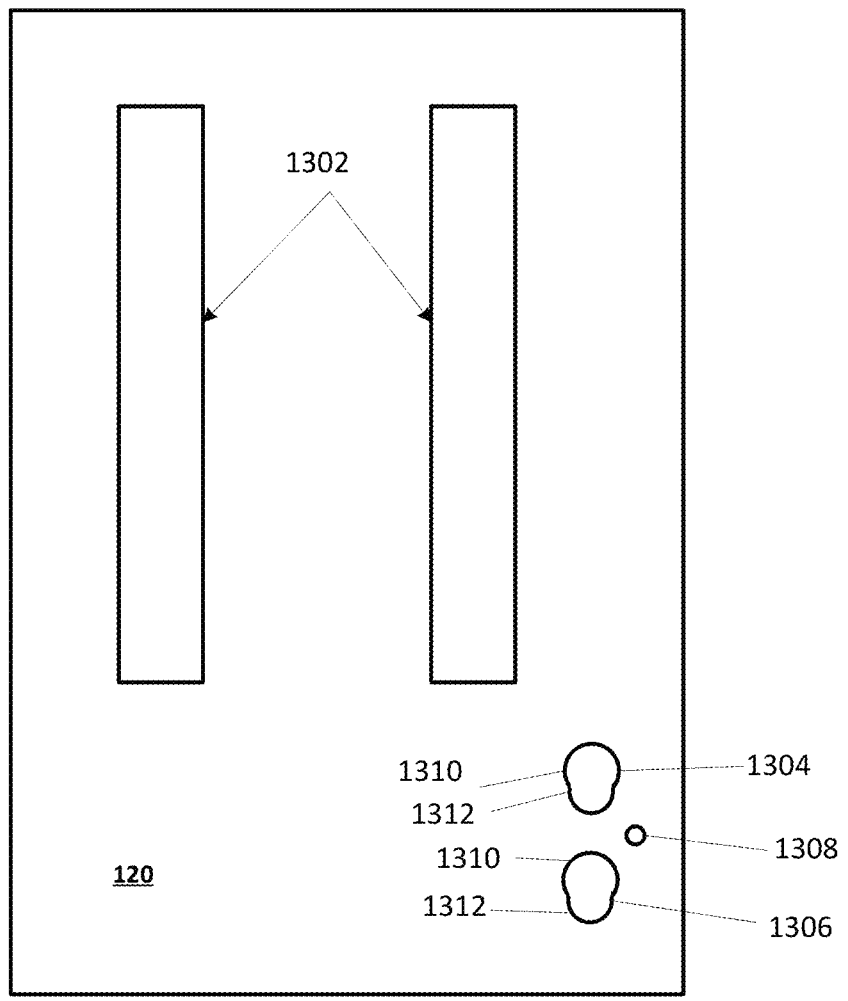
FIG. 13 illustrates a top view of a pallet configure that can be employed by a parking space equipped with an electric vehicle charging station.

FIG. 13 illustrates a top view of a pallet 120 configure that can be employed by a parking space 114 with an electric vehicles charging station 1000. The pallet 120 comprises a pair of tracks or guides 1302 where the vehicle tires are is parked. As will be illustrated herein, infra, keyholes 1304 and 1306 are configured to engage the bottom surface of plug unit 1002, and allow contacts on the bottom of the plug unit 1002 to engage contacts 1104 on the bottom surface 1102 of the parking space equipped with an electric vehicle charging station 1000. In an example embodiment, the keyholes 1304, 1306 have a larger circular section 1310 and a smaller elongated circular section 1312. An aperture 1308 is provided for engaging a retaining pin (not shown, see e.g., FIG. 14) for holding the plug unit in place.

Figure 14:
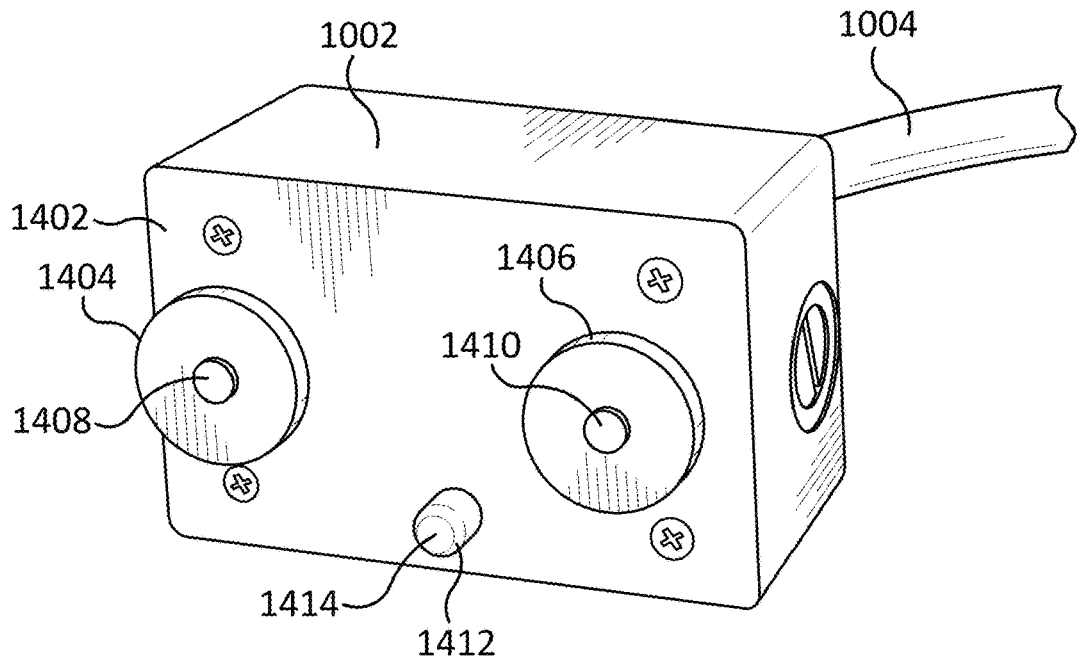
FIG. 14 illustrates an example of a plug unit that can be employed by the pallet illustrated in FIG. 13.

FIG. 14 illustrates an example of a plug unit 1002 that can be employed by the pallet 120 illustrated in FIG. 13. On the bottom surface 1402 of the plug unit 1002 are annular rings 1404, 1406 that are configured to engage keyholes 1304, 1306. Annular rings 1404, 1406 are sized to fit into the larger circular sections 1310 of keyholes 1304, 1306 and hold the plug unit 1002 in place when slid into the smaller elongated circular sections 1312 of keyholes 1304, 1306. Contacts 1408, 1410 are configured to fit through keyholes 1304, 1306 and engage contacts 1104 on the bottom surface 1102 of the parking space equipped with an electric vehicle charging station 1000 when the pallet 120 is in the proper position within the parking space equipped with an electric vehicle charging station 1000.

In an example embodiment, an aperture 1412 is provided through the body of the plug unit 1002. This can allow a retaining pin 1414 to pass through the body of the plug unit, and pass through aperture 1308 to hold the plug unit 1002 in place.

Figure 15:
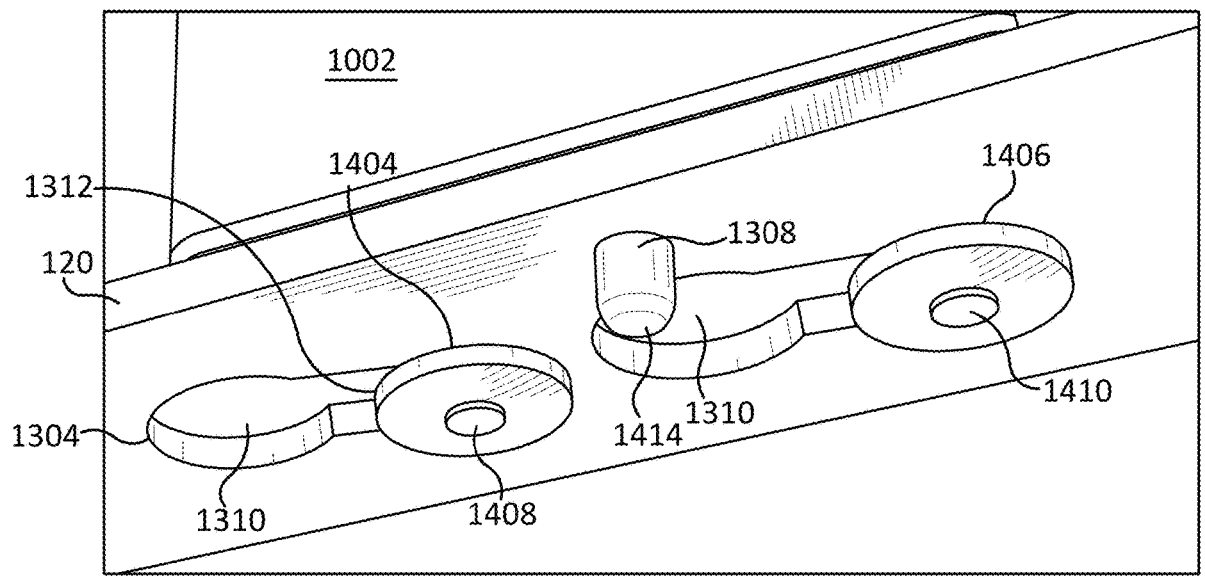
FIG. 15 illustrates an example of the plug unit illustrated in FIG. 14 coupled with the pallet illustrated in FIG. 13.

FIG. 15 illustrates an example of the plug unit 1002 illustrated in FIG. 14 coupled with the pallet 120 illustrated in FIG. 13. This example illustrates the plug unit 1002 in the installed position where the annular rings 1404, 1406 are engaged with the small section (not shown, see e.g., FIG. 13) of keyholes 1304, 1306 respectively and the retaining pin 1414 passing through aperture 1308 of the pallet 120 to hold the plug unit 1002 in place.

Figure 16:
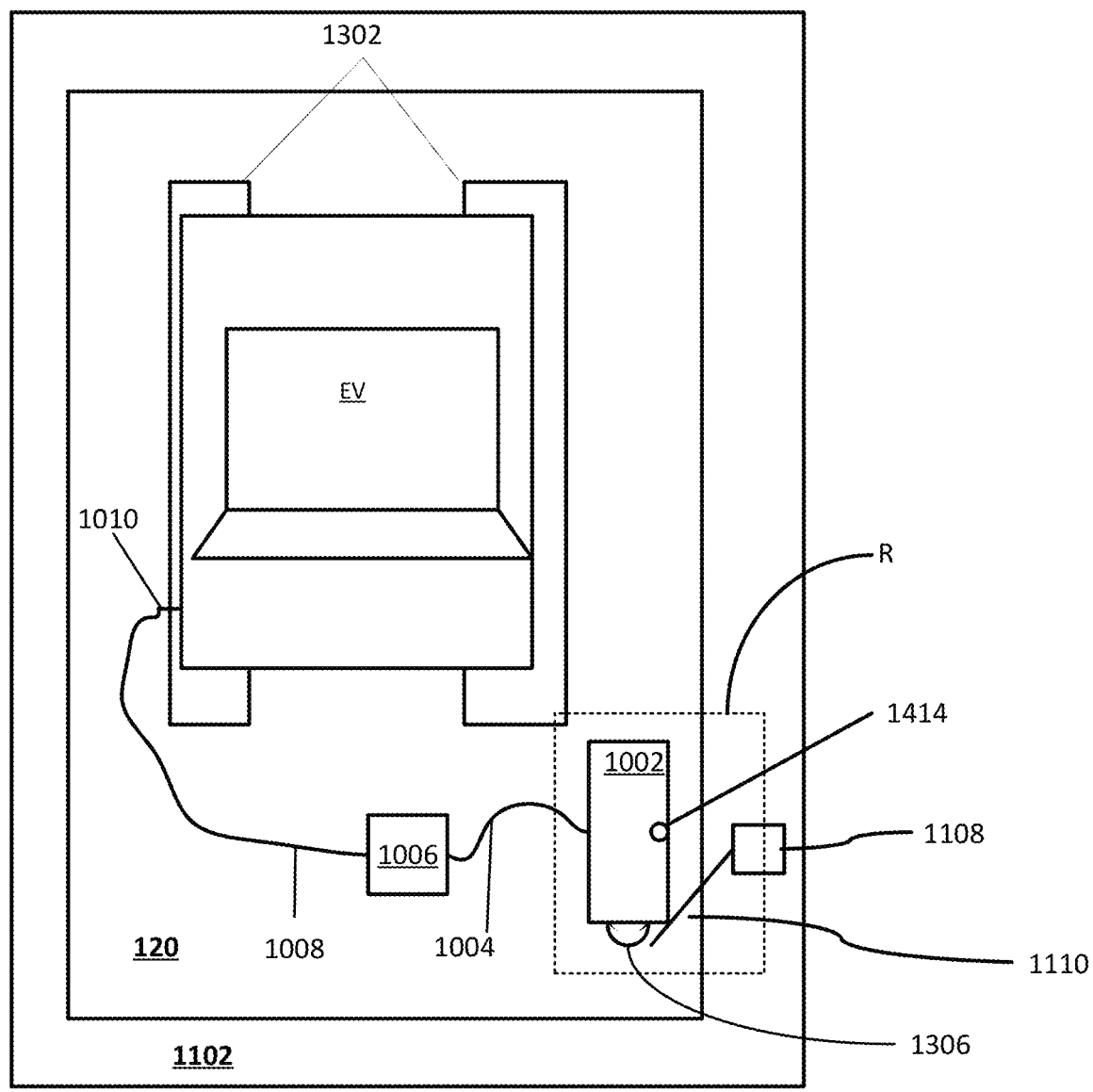
FIG. 16 illustrates an example of a pallet in a parking space equipped with an electric vehicle charging station in the operational position.

FIG. 16 illustrates an example of a pallet 120 in a parking space equipped with an electric vehicle charging station 1000 in the operational position. When the pallet 120 is in the proper position in a parking space equipped with an electric vehicle charging station 1000, the plug unit 1002 engages the lever 1110 of switch 1108 which causes power to be provided to the electric vehicle EV via the power source 1112, switch 1110, contacts 1104, contacts 1408, 1410, plug unit 1002, cable 1004, charger 1006, cable 1008, and receptacle 1010. As will be described in more detail herein, the vehicle can be charged until fully charged or for a predefined (e.g., prepaid) time period. After charging is completed, the vehicle can be moved to another parking space 114 and another electric vehicle can be charged in the same EV charging station 1000.

Figure 17:
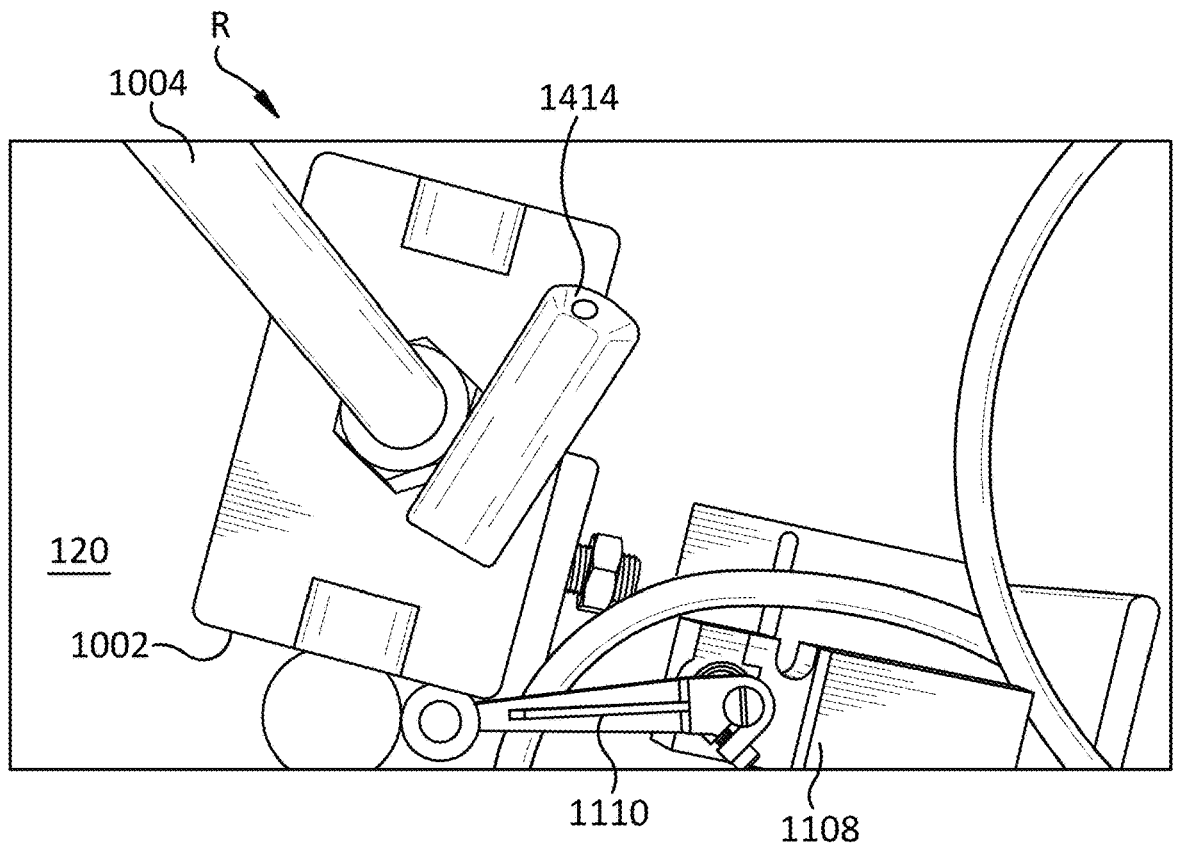
FIG. 17 illustrates an exploded view of the area bounded by rectangle R in FIG. 16.

FIG. 17 illustrates an exploded view of the area bounded by rectangle R in FIG. 16. FIG. 17 illustrates an example of the plug unit 1002 engaging the lever 1110 of switch 1108. When the lever 1110 is in this (predetermined) position, power is provided to the plug unit 1002 via contacts underneath pallet 120 as shown and described herein. In the illustrated example, the retaining pin 1414 is a T shaped pin to hold the retaining pin 1414 in place at the top of the plug unit 1002.

Figure 18:
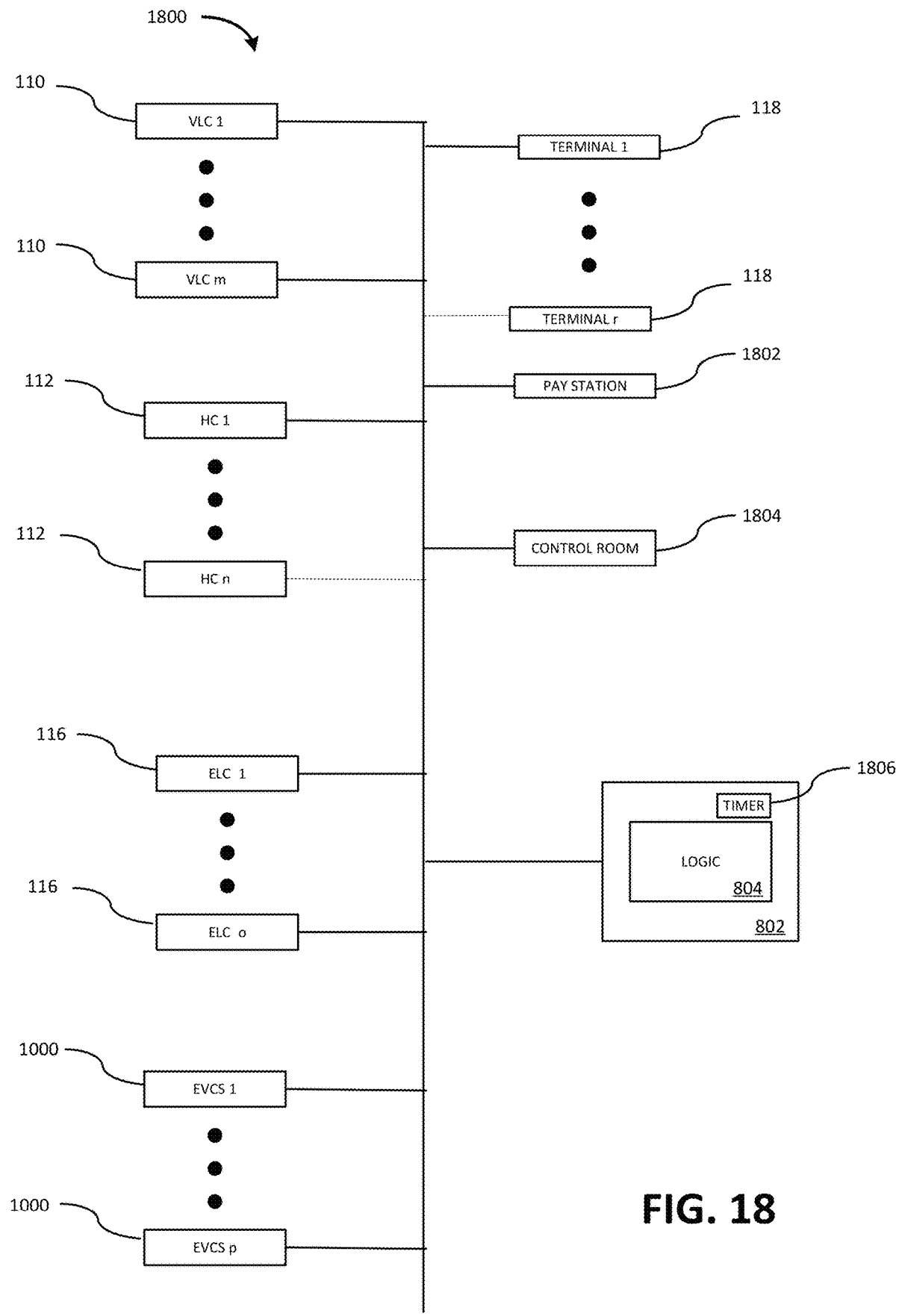
FIG. 18 is a block diagram illustrating an example of a system for operating an automated parking garage with an electric vehicle charging station.

FIG. 18 is a block diagram illustrating an example of a system 1800 for operating an automated parking garage 100 that has parking spaces 114 with electric vehicle charging stations 1000. The automated parking garage 1000 comprises entry level carriers 116, horizontal carriers 112, and vertical lift carriers 110 coupled with controller 802 as described herein, supra. In the illustrated example, the system further comprises a number (p) of electric vehicle charging stations "EVCS" (where p is an integer greater than zero), a number (r) of terminals 118 (where r is an integer greater than zero), and pay stations 1802 that are also coupled with controller 802. The pay stations can be co-located in the terminals 118 or can be in lobbies (not shown, see e.g., U.S. Pat. No. 6,662,077, the entire contents of which are hereby in incorporated by reference in their entirety). The system 1800 can have any physically realizable number of Electric Vehicle Charging Stations 1000, terminals 118, and/or Pay Stations 1802. The number of EVCS 1000, terminals 118, and pay stations 1802 in the example embodiments described herein were merely selected for ease of illustration.

In an example embodiment, a customer moves their vehicle into a terminal 118 and proceeds to a pay station 1802 to pay for parking, and optionally electric vehicle charging. The controller 802 is operable to provide an option allowing the customer to charge to the customer's (electric) vehicle, and if the vehicle is to be charged, the charging parameters such as level (e.g., voltage), length of time can be specified. The controller 802 causes a message to be displayed at a user interface in the control room 1804 to notify an attendant to setup the vehicle for electric charging (e.g., mount plug unit 1002 onto the pallet 120, couple the charging unit 1006 via cable 1004 to the plug unit 1002, couple the receptacle 1010 via cable 1008 to the charging unit 1006, and/or plug the receptacle 1010 into the electric vehicle EV. In an example embodiment, the attendant sets up the vehicle for charging while the vehicle EV is within terminal 118, however, the vehicle can be moved to any suitable location for setup.

If an electric vehicle charging station 1000 is available, the controller 802 is operable to select the appropriate entry level carrier 116, horizontal carrier 112, and/or vertical lift carrier 110 to cause the pallet 120 carrying the electric vehicle to be moved to the EVCS 1000. If an EVCS 1000 is not available, the controller 802 can cause the EV to be moved into a temporary parking space 114

In an example embodiment, the controller is coupled with the EVCS 1000 and is operable to switch the EVCS off after charging time is completed. The controller 802 switches the EVCS when a predetermined (e.g., prepaid) time period has expired. In an example embodiment, the controller 802 comprises a timer 1806 for tracking charging time for the EV.

After the EV has been charged, the controller 802 is operable to cause the vehicle to be moved from the EVCS 1000 to a parking space 114 without an EVCS 1000. The controller 1800 is operable to select the appropriate entry level carrier 116, horizontal carrier 112, and/or vertical lift carrier 110 to cause the pallet 120 carrying the electric vehicle to be moved to the selected parking space 114. As the (first) EV is being moved to parking space 114, the controller 802 is operable to cause the next (or second) vehicle to be charged to be moved to the EVCS 1000. In an example embodiment, the second vehicle can be moved to the EVCS 1000 either concurrently or simultaneously, as the first EV is being moved from the EVCS 1000 to its next destination (e.g., a different parking space 114. The second vehicle can be moved to the EVCS 1000 from either a terminal 118 or a (second) parking space 114.

Figure 19:
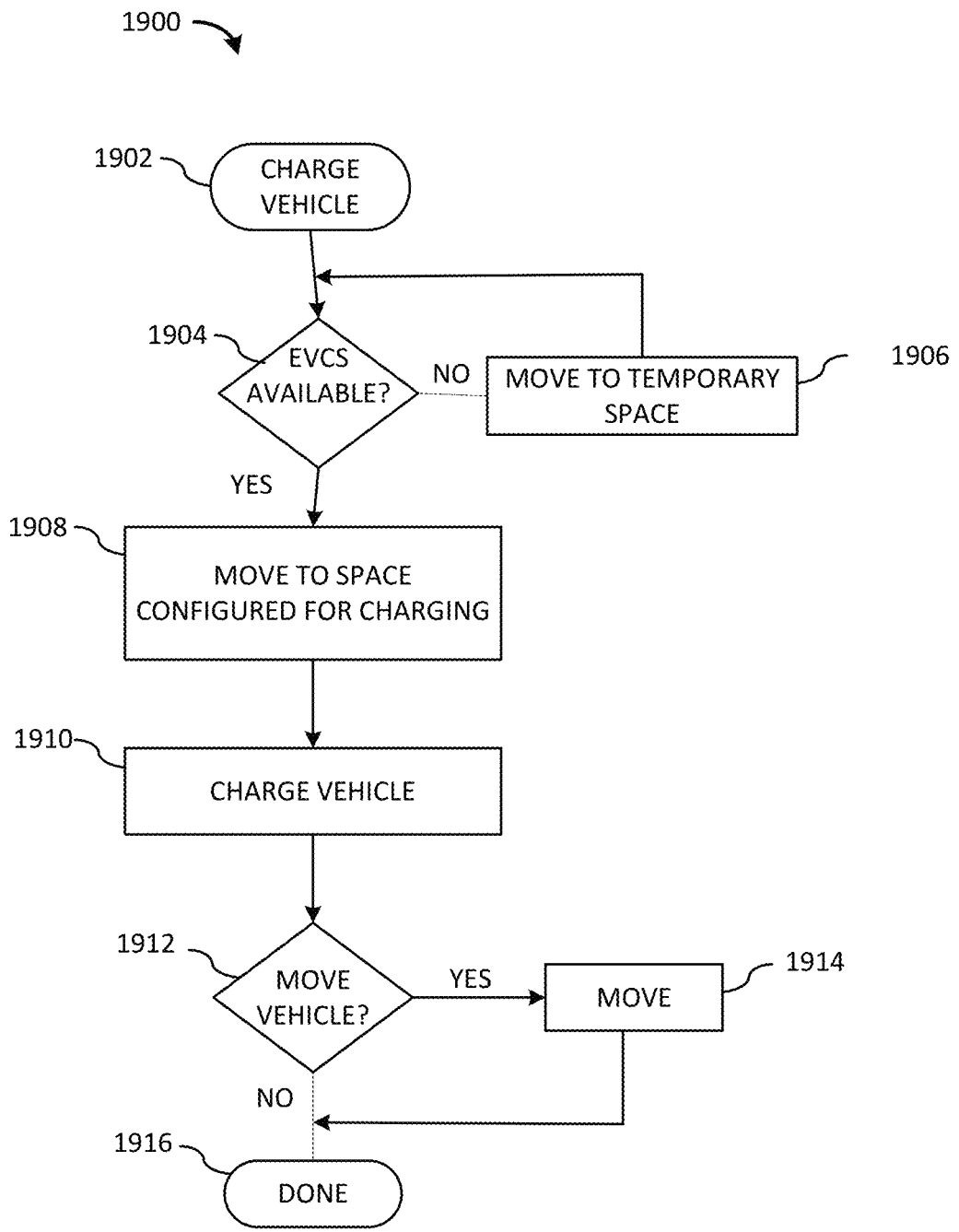
FIG. 19 illustrates an example methodology to provide electric vehicle charging at an automated parking garage.

In view of the foregoing structural and functional features described above in FIGS. 10-18, a methodology 1900 in accordance with an example embodiment will be better appreciated with reference to FIG. 19. While, for purposes of simplicity of explanation, the methodology 1900 of FIG. 19 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement an example embodiment. The methodology 1900 described herein is suitably adapted to be implemented in hardware, software when executed by a processor, or a combination thereof. For example, methodology 1900 can be implemented by logic 804 of controller 802.

At 1902, a vehicle is designated for charging. For example, a customer upon parking their vehicle in a terminal, can request vehicle charging at a lobby in the automated parking garage 100 (see e.g., U.S. Pat. No. 6,502,011, the entire contents of which are incorporated by reference herein, for an example of a lobby). Optionally, the customer can pay in advance for charging services or can pay when the pickup the vehicle. The customer can also specify desired parameters for charging, for example standard 120 volt(V) home outlets (Level 1), 208-240V outlets (Level 2), or dedicated 480V+ fast chargers, time to charge and/or fully charge (for example receptacle 1010 can be configured with a sensor for detecting when the EV's battery or batteries are fully charged which can be communicated via cable 1008 to charging unit 1006 which can switch off when the battery or batteries are fully charged At 1904, a determination is made whether there is an EVCS available. The availability is determined if any one of the EVCS is free. For example, his can depend on whether the EVCS can meet the desired charging parameters (such as can the EVCS provide a Level 3 charge).

If there it is determined that an EVCS is not available at 1904 (NO), at 1906, the vehicle can be moved to a temporary space 114 until an EVCS is available. For example, during off peak hours when there are few cars entering or leaving the automated parking garage, the vehicle can sit at the terminal until the EVCS is ready. Otherwise, the vehicle can be moved to any available parking spot in the garage until an EVCS is ready.

If, at 1904, it is determined that an EVCS is available (YES), at 1908, the EV is moved into a parking space configured with an electric vehicle charging station. Examples of a parking space configured with an electric vehicle charging station are provided in FIGS. 10-18. The controller selects the appropriate carriers or route (entry level, horizontal, and/or vertical) for transporting the vehicle to the parking space with the EVCS.

At 1910, the vehicle is charged at an EVCS. As indicated in FIGS. 16-17, when the pallet is in the proper position for charging, contacts on the plug unit engage contacts on the level of the parking space. A switch located within the parking space is switched to a predefined position, energizing the contacts on the bottom, of the parking space. When the pallet is moved out of the parking space, the switch returns to the off position, de-energizing the contacts on the level of the parking space.

At 1912, a determination is made whether to move the vehicle. For example, the vehicle can be moved from the EVCS to another parking space (that in an example embodiment does not have an EVCS) so that another vehicle can be charged at the EVCS. Thus, every space in the automated parking garage does not need to be provided with an EVCS to provide charging services to electric vehicles, which can reduce the cost of providing charging to electric vehicles.

If, at 1912, the decision was made to move the electric vehicle, at 1914, the electric vehicle is moved to another parking spot. The controller can select the appropriate carriers (entry level, horizontal, and/or vertical) to move the electric vehicle from the EVCS to another parking space. While the electric vehicle is moving to another parking space, another vehicle can be, concurrently or simultaneously, moved to the EVCS.

After the vehicle has been moved at 1914, the method is done as indicated by 1916. Alternatively, if at 1912, the determination is made not to move the electric vehicle (NO), at 1916.

Methodology 1900 can be implemented concurrently or simultaneously for multiple vehicles. The multiple vehicles can share the same charging station (where one vehicle is charge while the other vehicles wait somewhere else within the garage, for example at other parking spaces), and/or the multiple vehicles can be moved to multiple EVCS's.

Figure 20:
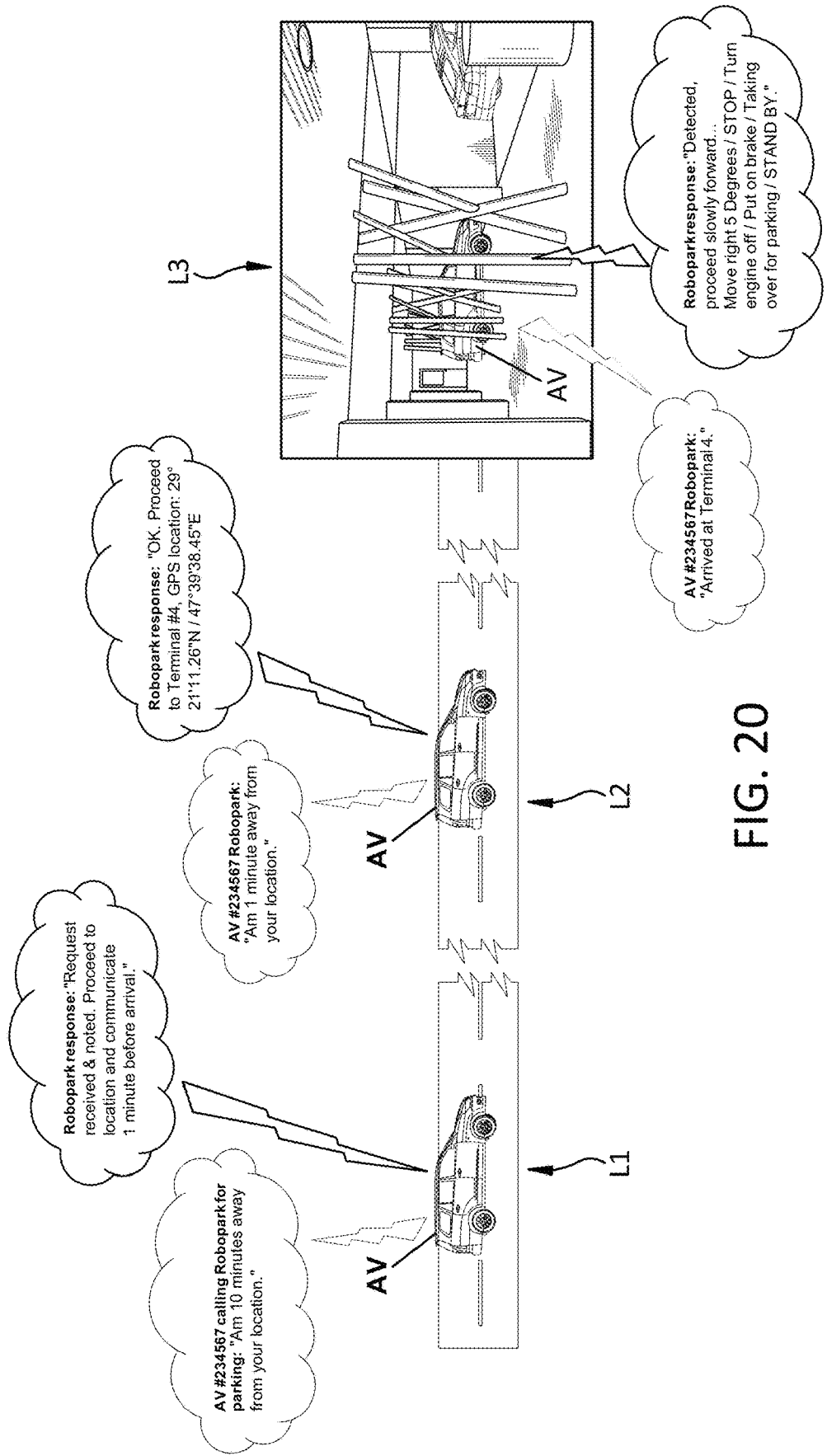
FIG. 20 illustrates an example of the communications between an autonomous vehicle and an automated parking garage.

FIG. 20 illustrates an example of the communications between an autonomous (or self-driving) vehicle "AV" and an automated parking garage 100. In an example embodiment, the AV can sense its environment and is self-driving. A human may not be present. The AV is provided with an app that allows the AV to communicate with the Automated Parking garage. The vehicle while at a first location L1 sends a wireless signal to the automated parking garage 100 requesting to park in the automated parking garage 100. A controller (not shown, see e.g., FIG. 21 associated with the parking garage 100 responds to the request to park in the automated parking garage 100 and instructs the autonomous vehicle V to contact the controller within a predefined proximity of the automated parking garage 100. In an example embodiment, the predefined proximity can be provided as an estimated time of arrival from the parking garage 100 (e.g., estimated arrival within one minute). In another example embodiment, the predefined proximity is a physical distance from the garage. The autonomous vehicle V then moves to a location, illustrated as L2 in this example, within the predefined example.

The controller associated with the automated parking garage 100 is operable to receive a second signal from the autonomous vehicle V when the autonomous vehicle V is within the predefined proximity from the automated parking garage 100. In response to the second signal, the controller selects a selected terminal from the plurality of terminals and provides coordinates of a location associated with the selected terminal (for example GPS coordinates).

The controller can either detect when the vehicle arrives at the location associated with the selected terminal (e.g., L3) and/or the autonomous vehicle can be instructed to contact the controller upon arrival at the location associated with the selected terminal.

Upon arrival at location L3, the controller, the controller can send a signal to the autonomous vehicle V to turn off engine and provide instructions for passengers to exit the vehicle. The controller and the autonomous vehicle V exchange signals to move the autonomous vehicle V from the location associated with the selected terminal L3 into the selected terminal (T4 118-4 in this example). Once the autonomous vehicle V is within the selected terminal, the controller can operate the carriers within the garage to move the vehicle to a selected parking space. If desired, these AV can also be charged as described herein.

In an example embodiment, the controller is operable to select a terminal and parking space based on the type of vehicle and/or dimensions of the autonomous vehicle V. For example, the automated parking garage 100 may have certain parking spaces and/or terminals that are capable of handling larger vehicles, such as busses or semi tractors, which the controller would select for parking these types of vehicles.

In particular embodiments, not all of the signals described herein are required. For example, the controller for the parking garage can select a terminal and send the terminal's coordinates in response to the first signal, obviating the need for a second signal. In the example illustrated in FIG. 20, if the autonomous vehicle V sends the first signal while at location L2, then the parking garage controller can select a terminal and send the coordinates in response to the first signal.

Figure 21:
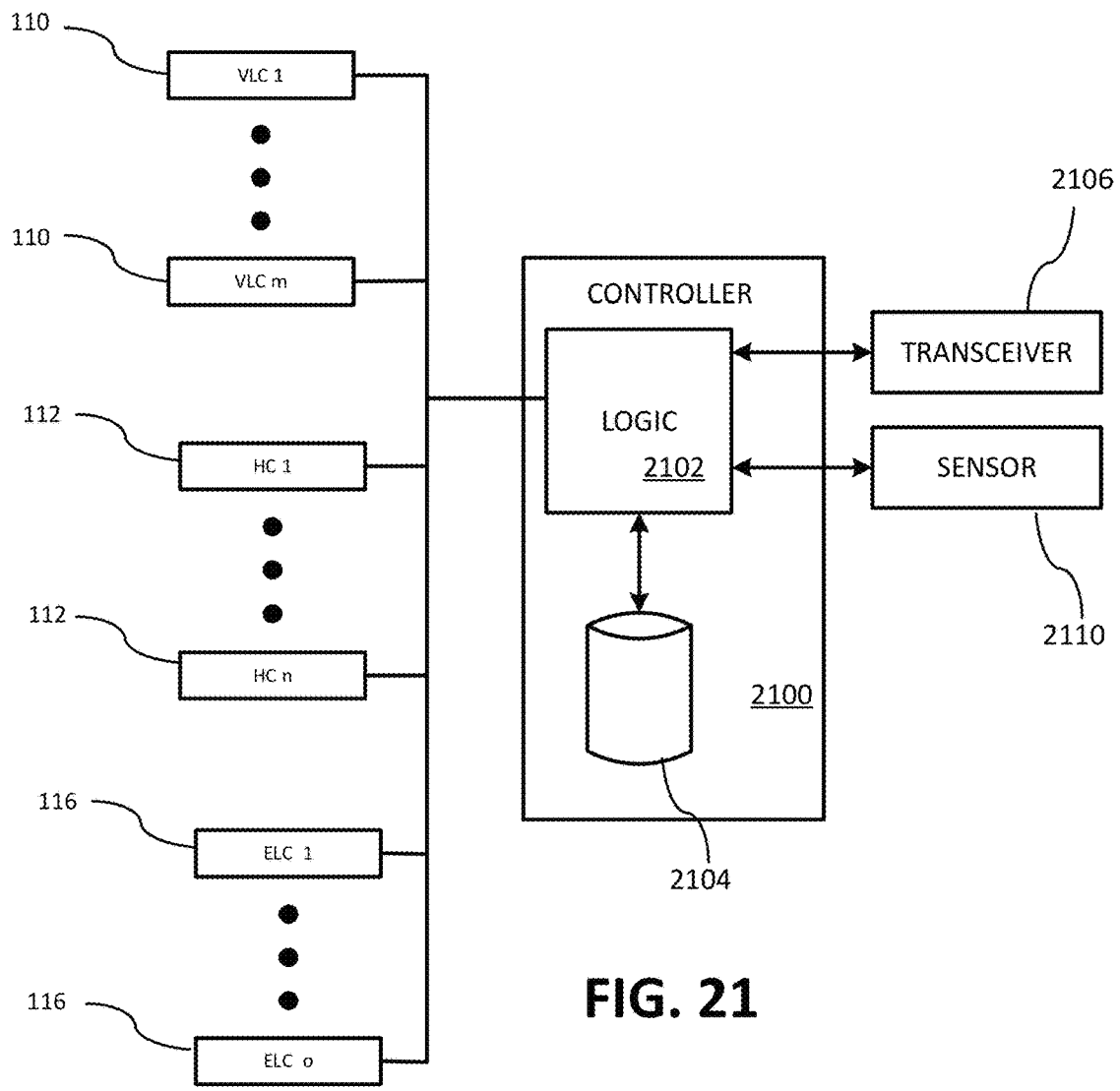
FIG. 21 is a block diagram that illustrates an example of a system employed by an automated parking garage for parking an autonomous vehicle.

FIG. 21 is a block diagram that illustrates an example of a system employed by an automated parking garage for parking an autonomous vehicle. The system comprises a controller 2100 that has logic 2102 that implements the functionality described herein and a data storage unit, or memory, 2104. The controller 2100 is coupled with a wireless transceiver 2106 that is employed to communicate with autonomous vehicles. The controller is also coupled with vertical lift carriers 110, horizontal carriers 112, and entry level carriers 116 and is operable to control the operation of the vertical lift carriers 110, horizontal carriers 112, and entry level carriers 116. The controller 2100 is connected to the terminals 118 to determine which terminals are available for AV upon estimated arrival, and to provide the GPS coordinates to AV to drive to the right location.

In an example embodiment, the data store 2104 contains information on the vehicles parked within the automated parking garage 100, available parking spaces, parking spaces with electric vehicle charging stations, and/or other configurations of the parking spaces (e.g., standard sedans, or SUV's, large vehicle, etc.) of the automated parking garage 100.

In an example embodiment, the controller 2100 is located within the physical confines of the automated parking garage 100. In another example embodiment, the controller 2100 is remote from the automated parking garage 100.

In an example embodiment, the controller 2100 is operable to receive a first signal from an autonomous vehicle requesting to park in the automated parking garage 100 via the wireless transceiver 2106. The controller 2100 is responsive to receiving the first signal to cause instructions to be provided to the autonomous vehicle (e.g., V in FIG. 20) to send a second signal when within a predefined proximity e.g., L2 in FIG. 20) of the automated parking garage 100.

The controller 2100 is responsive to receiving the second signal, via the wireless transceiver 2106, to select a selected terminal from the plurality of terminals from the plurality of terminals and to cause coordinates to an area associated with the selected terminal (e.g., L3 in FIG. 20) and instructions to send a third signal when at the area associated with the selected terminal to be sent via the wireless transceiver 2106 to the autonomous vehicle.

The controller 2100 is responsive to receiving the third signal to exchange signals with the autonomous vehicle that causes the autonomous vehicle to move into the selected terminal. In an example embodiment, the signals include instructions to have passengers exit the vehicle. A button near the entrance to the terminal or sensors within the autonomous vehicle can be employed to let the controller 2100 know the passengers have exited the autonomous vehicle. The controller 2100 and autonomous vehicle then exchange signals to move the autonomous vehicle to position the autonomous vehicle in the correct position on a pallet at the selected terminal (e.g., start, move right, left, and/or forward, stop, power off). After the vehicle has entered the selected terminal, the controller 2100 can operate the carriers (e.g., VLC 110, LC 112, and/or ELC 116) to move the autonomous vehicle to a selected parking space.

In an example embodiment, the automated parking garage comprises a sensor 2110 coupled with controller 2100 for detecting the position and location of the autonomous vehicle. The logic 2102 in controller 2100 can employ feedback from the sensor 2110 to aid in correctly positioning the autonomous vehicle on a pallet. Once the autonomous vehicle is correctly positioned on the pallet, the logic 2102 in controller 2100 initiates the parking process.

In an example embodiment, the controller 2100 is operable to receive, via the wireless transceiver 2106, a signal from a second autonomous vehicle that comprises a request to park in the automated parking garage. The controller 2100 is responsive to the signal from the second autonomous vehicle to determine whether a parking space is available. The controller 2100 is operable to cause the transceiver 2106 to send a signal denying, or approving, the request to park in the automated parking garage to be sent to the autonomous vehicle responsive to the signal from the second autonomous vehicle and determining whether a parking space is available.

In an example embodiment, the controller 2100 is operable to select a selected parking space from the plurality of parking spaces for parking the autonomous vehicle. The controller 2100 is operable to operate at least one carrier selected from the group consisting of the entry level carrier 116, the vertical lift carrier 110 and the upper horizontal carrier 112 to move the autonomous vehicle from the selected terminal to the selected parking space. In particular embodiments, the controller 2100 selects a terminal and parking space for the autonomous vehicle based on the vehicle's dimensions. For example, a pickup truck would require a larger space than a subcompact car. The automated parking garage 100 can be equipped with different sized spaces and/or terminals for handling different sized vehicles.

Figure 22:
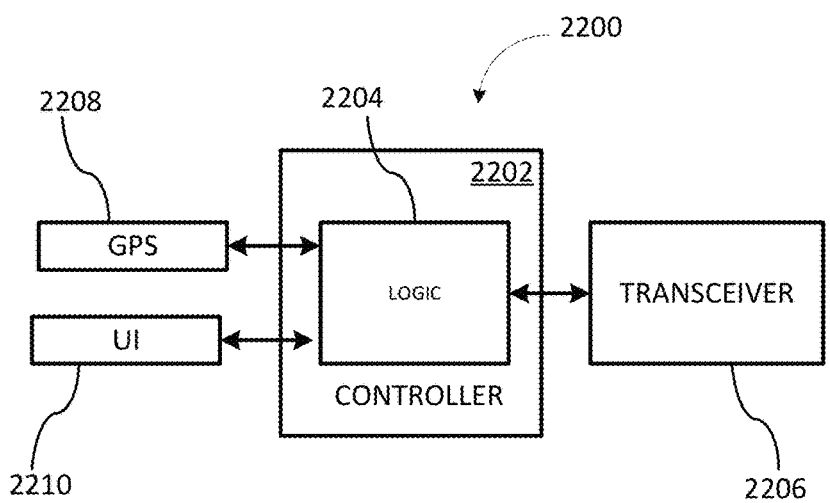
FIG. 22 is a block diagram that illustrates an example of a system employed by an autonomous vehicle for parking in an automated parking garage.

FIG. 22 is a block diagram that illustrates an example of a system 2200 employed by an autonomous vehicle for parking in an automated parking garage. For example, system 2200 can be employed by autonomous vehicle AV described in FIG. 20.

The system 2200 comprises a controller 2202 that comprises logic 2204 for implementing the functionality descried herein. The system 2200 further comprises a wireless transceiver 2206, a location detection system such as a Global Positioning System ("GPS") 2308 and a user interface ("UI") 2210. The wireless transceiver 2206 is for communicating with external systems, such as for example an automated parking garage. The Global Positioning System (GPS) 2208. is operable to determine the location of the vehicle, and provide route guidance to a given set of coordinates. The user interface 2210 allows a user (for example the driver) of a vehicle to input commands to controller 2302. The commands can be input via any suitable technique such as a tactile and/or audio input.

In an example embodiment, a user (such as the driver) of an automated vehicle can input via the UI 2210 data representative of an automated parking garage. For example, the user may input a name and/or address of a garage, select from a list of favorites, or can request the location of nearby garages which can be output on UI 2210 and the user can select an automated parking garage from a plurality of automated parking garages. Once a destination is selected, the AV can operate independently (e.g., driverless) to the destination.

The logic 2204 in controller 2202 employs the wireless transceiver 2206 to contact the garage. The logic in controller 2202 causes the wireless transceiver 2306 to signals the automated parking garage and request to park there. If the automated parking garage has an available space, the controller 2202 receives a signal via transceiver 2206 to proceed. In an example embodiment, the signal further comprises data indicating that the controller 2202 contact the automated parking garage when the autonomous vehicle is within a predefined proximity of the automated parking garage. The logic 2204 in controller 2202 employs the GPS 2208 to determine a route to the automated parking garage and to determine when the autonomous vehicle is within the predetermined proximity of the automated parking garage. Upon proceeding within the predefined proximity to the automated parking garage as determined by GPS 2208, the logic 2204 in controller 2202 causes a signal to be sent to the automated parking garage via transceiver 2206 informing the automated parking garage that the autonomous vehicle is within the predefined proximity. The logic 2204 in controller 2202 receives coordinates of the terminal for parking the autonomous vehicle from the parking garage via wireless transceiver 2206. The logic 2204 in controller 2202 employs the GPS 2208 to proceed to the coordinates for the terminal provided by the automated parking garage. Upon arrival at the terminal (e.g., when within a predefined proximity of the terminal), the logic 2204 of controller 2202 causes a signal to be sent to the automated parking garage indicating the autonomous vehicle has arrived. In an example embodiment, a handshaking protocol is employed to position the AV in the correct location in 118

The logic 2204 in controller 2202 monitors and communicates with the garage to position the autonomous vehicle correctly onto a pallet. In an example embodiment, the system 2200 further employs a sensor (e.g., sensor 2110 in FIG. 21) to detect the position of the autonomous vehicle. Once the autonomous vehicle is correctly positioned, a handshake can be performed, and the automated parking process is initiated.

In view of the foregoing structural and functional features described above in FIGS. 20-22, methodologies in accordance with example embodiments will be better appreciated with reference to FIGS. 23-24. While, for purposes of simplicity of explanation, the methodologies of FIGS. 23-24 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required. The methodologies described herein are suitably adapted to be implemented in logic, such as hardware, software stored on a computer readable medium executed by a processor, or a combination thereof.

FIG. 23 is a block diagram that illustrates an example of a methodology 2300 employed by an automated parking garage for parking an autonomous vehicle. In an example embodiment, the methodology 2300 can be implemented by controller 2100 (FIG. 21) which can be employed by parking garage 100 (FIG. 1) to park an autonomous vehicle V as illustrated in FIG. 20.

At 2302, a request is received from an autonomous vehicle to park in the automated parking garage. In an example embodiment, the request is received wirelessly from the autonomous vehicle. In another example embodiment, the request can be initiated by a customer employing a computing device. such as a smartphone application, to reserve a spot.

At 2304, a determination is made whether a parking space is available. In an example embodiment, the size of the vehicle e can be employed in determine whether a parking space is available. For example, a truck may not be able to fit into a subcompact space, but a subcompact can fit into a truck space.

At 2306, if the determination at 2304 is that there are no parking spaces available, (NO), the request is denied. In an example embodiment, the automated parking garage is configured to contact the autonomous vehicle when a parking space becomes available. The autonomous vehicle can then send another request.

If, at 2304, a parking space is available (YES), a signal is sent to the autonomous vehicle indicating the request is approved. In an example embodiment, instructions are sent to the autonomous vehicle (or other computing device making the request for the autonomous vehicle) to contact the automated parking garage when the autonomous vehicle is within a predefined proximity of the automated parking garage. The predefined proximity can be expressed as a measurement of time (estimated time of arrival within x minutes) or distance (within x feet/meters/miles, etc.).

At 2310, the automated parking garage receives a signal from the autonomous vehicle indicating that the autonomous vehicle is within the predefined proximity. In an example embodiment, the signal can comprise data representative of the autonomous vehicle's current location, such as GPS coordinates, distance, and/or estimated time of arrival.

At 2312, the automated parking garage controller determines a terminal for receiving the vehicle. The coordinates for the terminal are provided to the autonomous vehicle.

At 2314, a signal is received from the autonomous vehicle indicating that the autonomous vehicle has arrived at the designated terminal. In an example embodiment, the signal can comprise data representative of the autonomous vehicle's current location, such as GPS coordinates and/or proximity from the terminal.

At 2316, signals are exchanged with the autonomous vehicle to correctly align the autonomous vehicle with a pallet at the designated terminal. In an example embodiment, the automated parking garage employs feedback from one or more sensors to determine the location, and in particular embodiments, the position (e.g., heading) are employed to move the autonomous vehicle onto the pallet. In response to the autonomous vehicle being correctly positioned onto the pallet, the controller in the automated parking garage initiates the parking process and moves the autonomous vehicle to a parking space.

FIG. 24 is a block diagram that illustrates an example of a methodology 2400 employed by an autonomous vehicle for parking in an automated parking garage. For example, this methodology 2400 can be implemented by the logic 2304 of controller 2302 in FIG. 23 for parking the autonomous vehicle V as illustrated in FIG. 20.

At 2402, a request is sent to the automated parking garage to park an autonomous vehicle. The request can be sent wirelessly from the vehicle itself or from a computing device associated with the user of the vehicle. In an example embodiment, the request includes details about the vehicle, such as the style of vehicle, whether the vehicle is an electric vehicle that will need charging, and/or details about the time the vehicle is expected to be parked in the garage such as an arrival and/or departure time.

At 2404, the vehicle receives instructions from the automated parking garage. The instructions can comprise GPS coordinates of the automated parking garage and/or instructions to contact the automated parking garage when the vehicle is within a predefined proximity from the automated parking garage (such as for example, an expected arrival time within a predefined time period and/or a predefined distance).

At 2406, the autonomous vehicle sends a signal to notify the automated parking garage when the autonomous vehicle is within the predefined proximity of the automated parking garage. In an example embodiment where the autonomous vehicle is within the predefined proximity to the automated parking garage when sending the request to park, this signal can be skipped, e.g., the notification is combined with the first signal.

At 2408, the autonomous vehicle obtains the location of the terminal to park the vehicle. In an example embodiment, the location is specified as GPS coordinates. Other data identifying the terminal, such as for example a terminal number, can also be provided.

At 2410, the autonomous vehicle signals the automated parking garage arrives at the terminal. The signal can be sent when the vehicle is within a predetermined distance to the terminal and/or within a predefined area.

At 2412, the vehicle is parked. This can include instructing the occupants of the car to exit the car. An exchange of signals between the automated parking garage and the autonomous vehicle that moves the autonomous vehicle onto the pallet at the proper orientation. In an example embodiment, the automated parking garage employs one or more sensors to obtain data representative of the location and position of the vehicle and uses this data to signal the vehicle how to move (e.g., left, right, forward, left 45 degrees for 3 feet, then straight 6 feet, etc.) to put the vehicle at the proper position on the pallet from parking. Once the autonomous vehicle is parked on the pallet, the automated parking garage can initiate the parking process (e.g., select an ELC, VLC, and/or HC to move the vehicle to its parking space).

Figure 25:
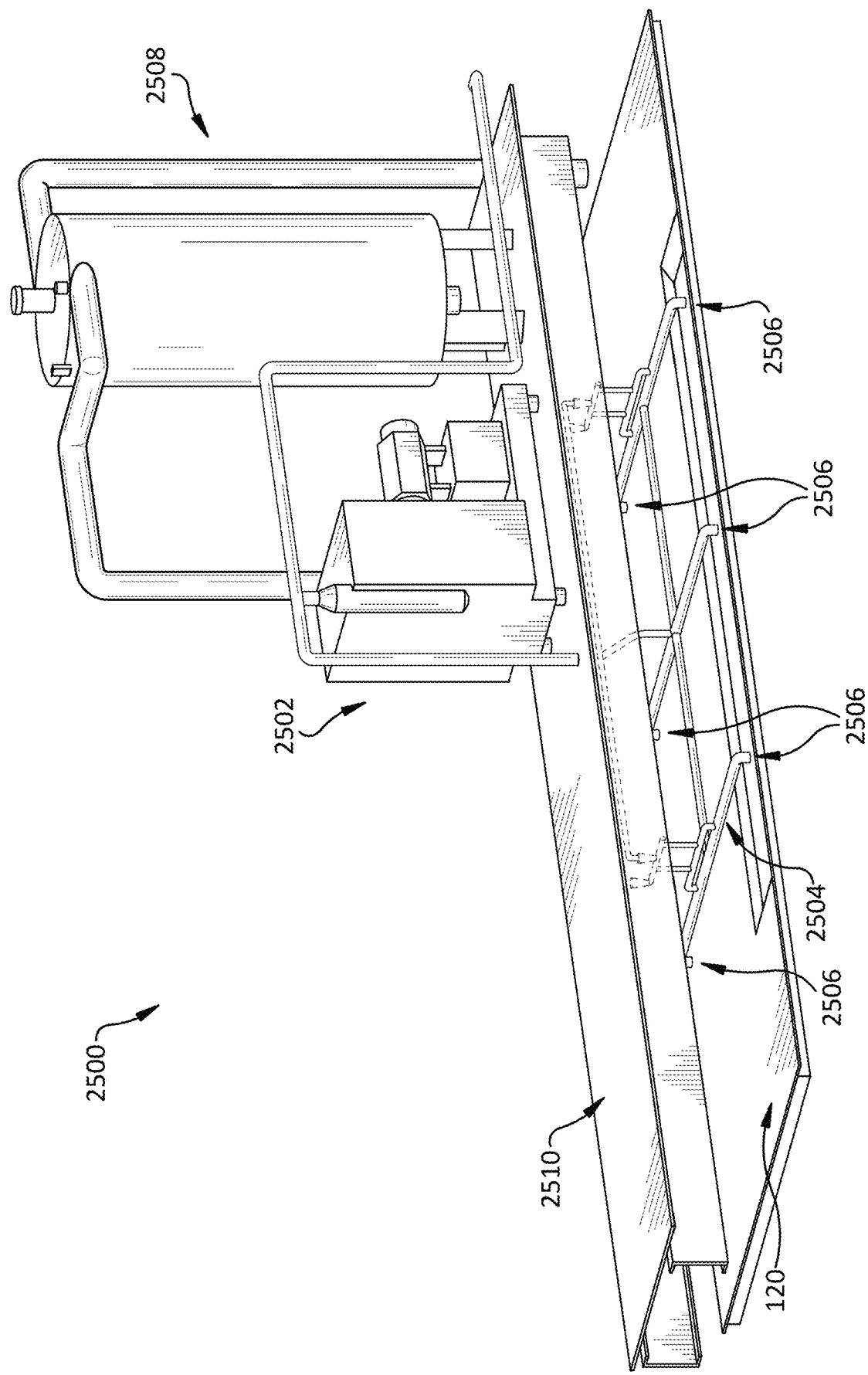
FIG. 25 is a perspective view illustrating an example of a pallet cleaning station.

FIG. 25 is a perspective view illustrating an example of a pallet cleaning station 2500. In the illustrated example, the pallet cleaning station 2500 employs a vacuum to clean ice, snow, stones, and other debris from pallets. The system 2500 comprises a vacuum source, such as for example a pump, 2502 that is coupled to a system of pipes and/or hoses 2504 having a plurality of nozzles 2506. The plurality of nozzles 2506 are positioned over a pallet 120 and suction provided by the vacuum source 2502 can suck water, snow, slush, and small stones from the pallet. In an example embodiment, for example where the pallet comprises grooves (see e.g., grooves 1302 in FIGS. 13 and 16), the plurality of nozzles 2506 are positioned over the grooves.

In an example embodiment, for cleaning, the pallet cleaning system can be lowered towards the pallet 120. In another example embodiment, the pallet 120 can be raised towards the pallet cleaning system 2500. In yet another example embodiment, the system of pipes and/or hoses 2504 is mechanically lowered towards the pallet 120.

In an example embodiment, after a vehicle has left the terminal 118, the outer door (not shown) is closed and the pallet is lowered below the terminal level 2510 onto a pallet shuttle (not shown), which transports the pallet to a pallet stacking station (not shown). An example of a system that employs a pallet shuttle for transporting a pallet between a terminal (also referred to as an entry exit station or "EES") and a pallet stacking station is illustrated in U.S. Pat. No. 6,851,921, the entire contents of which are hereby incorporated by reference. After the pallet is cleaned by the pallet cleaning system 2500, the pallet 120 is ready to be used to park vehicles again.

In an example embodiment, the pallet cleaning system 2500 is located between the terminal 118 and the pallet stacking station. In particular embodiments, the system of pipes and/or hoses 2504 is located below terminal level 2510 while the vacuum source 2502 and tank 2508 are located above the terminal level 2510. The illustrated example shows the plurality of nozzles 2506 has six nozzles, however, those skilled in the art can readily appreciate that the number of nozzles can be any desired, physically realizable number.

Figure 26:
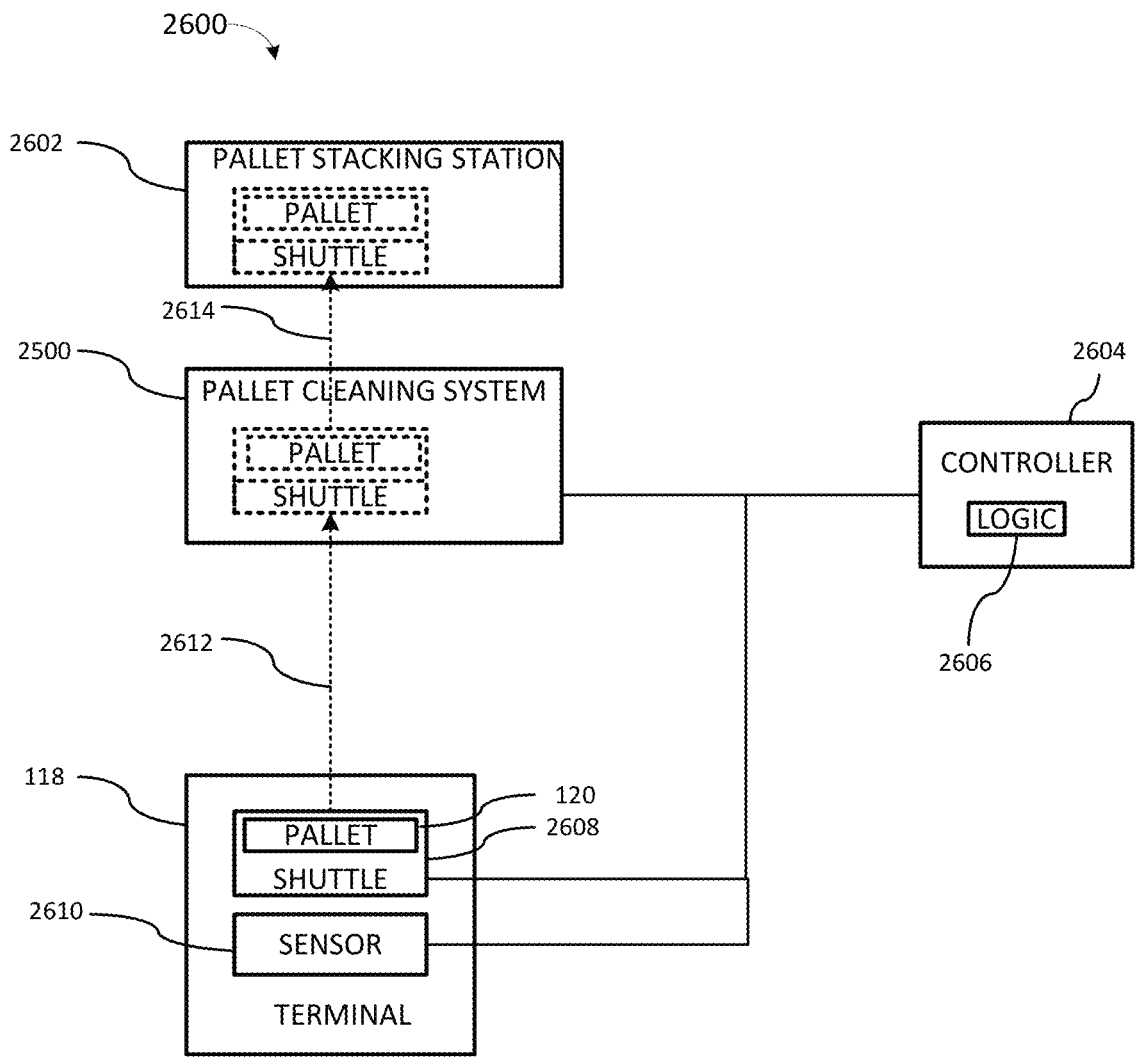
FIG. 26 is a functional block diagram of a system that employs a pallet cleaning system.

FIG. 26 is a functional block diagram of a system 2600 that employs a pallet cleaning system 2500. The system 2500 further comprises a pallet stacking station 2602, a controller 2604 that has logic 2606 for implementing the functionality of the controller 2604 described herein, and a pallet shuttle 2608 for transporting the pallet 120 between the terminal 118, pallet cleaning system 2500, and the pallet stacking station 2602. In particular embodiments, the terminal 118 comprises a sensor 2610 that can detect whether a car is on pallet 120.

In an example embodiment, the controller 2604 is communicatively coupled with the pallet cleaning system 2500, pallet shuttle 2608 and sensor 2610. The connections between the pallet cleaning system 2500, the pallet shuttle 2608 and sensor 2610 can include wired, wireless, or a combination of wired and wireless links. The sensor 2610 can be any suitable sensor for detecting when the vehicle has left the terminal 118. For example, the sensor 2610 can detect when the exterior door of terminal 118 has been opened and closed. As another example, the sensor 2610 can employ infrared or visual detection to detect objects within terminal 118. In yet another example, the sensor 2610 can detect the weight on pallet 120 to determine when the vehicle has exited terminal 118. In still yet other example embodiments, the sensor 2610 comprises a plurality of the aforementioned techniques.

In an example embodiment, When the logic 2606 in controller 2604 determines from sensor 2610 that the vehicle has left the terminal 118. The logic 2606 in controller 2604 causes the shuttle 2608 to move the pallet 120 to the pallet cleaning system 2500. In the example illustrated in FIG. 26, the pallet 120 is moved along path 2612 from the terminal 118 to the pallet cleaning system 2500. In an example embodiment, the pallet is lowered below the terminal level (2510; FIG. 25) for transportation. An example of a transportation system that employs a pallet shuttle to transport the pallet below the terminal level is described in is illustrated in U.S. Pat. No. 6,851,921, which has been incorporated by reference herein. The logic 2606 in controller 2604 controls the operation of the pallet cleaning system 2500. The logic 2606 causes the pallet cleaning system 2500 to clean the pallet 120 upon arrival at the pallet cleaning system. The logic 2606 can cause the vacuum source 2502 (FIG. 25) to switch on and off. In an example embodiment, the logic 2606 causes the piping system 2504 (FIG. 25) to lower (for cleaning) and raise (for transportation after cleaning). In an example embodiment, the pallet 120 has grooves. (see e.g., grooves 1302 in FIGS. 13 and 16), the plurality of nozzles 2506 are positioned to clean the areas within the grooves when the piping system 2504 is lowered. After the pallet cleaning system 2500 has cleaned the pallet 120, the pallet is ready for use. The logic 2606 causes the pallet shuttle 2608 to move the pallet to the pallet stacking station 2602 as represented by 2614, where the pallet is moved onto the stack for reuse.

Figure 27:
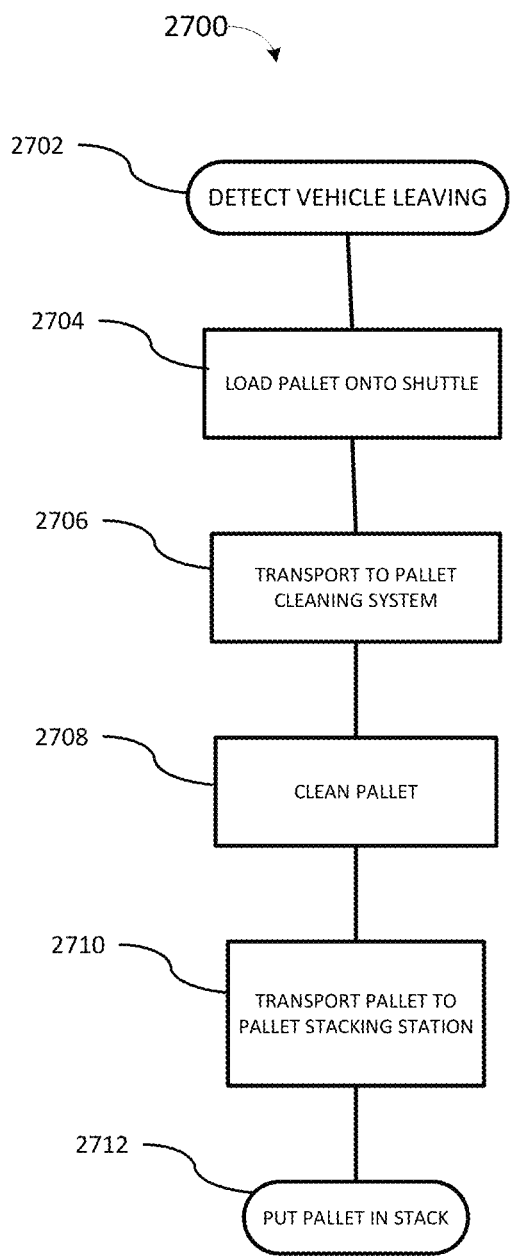
FIG. 27 is a block diagram of a methodology for cleaning a pallet.

In view of the foregoing structural and functional features described above in FIGS. 25 and 26, a methodology 2700 in accordance with an example embodiment will be better appreciated with reference to FIG. 27. While, for purposes of simplicity of explanation, the methodology 2700 of FIG. 27 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required. The methodology 2700 described herein is suitably adapted to be implemented in logic, such as hardware, software stored on a computer readable medium when executed by a processor, or a combination thereof. In an example embodiment, the methodology 2700 is implemented by the logic 2606 of controller 2604.

At 2702, the process begins when the vehicle is detected leaving the terminal. Any suitable method can be employed for detecting the vehicle exiting the terminal. Several examples of techniques for detecting the vehicle exiting the terminal are descried with reference to sensor 2610 in FIG. 26.

At 2704, the pallet from the terminal where the vehicle exited is loaded onto a shuttle (or retrieved). In an example embodiment, the pallet is lowered below the terminal level for transport.

At 2706, the pallet is transported to the pallet cleaning station. In an example embodiment, the pallet cleaning station is located between the terminal and the pallet stacking station. However, in other embodiments, the pallet cleaning station can be located in other locations. This can allow for a pallet cleaning station to be shared by multiple terminals and/or multiple pallet stacking stations.

At 2708, the pallet is cleaned. In an example embodiment, a vacuum system such as is described in FIG. 25 is employed to suck snow, slush, dirt, or other particles off the pallet. In particular embodiments where the pallet has grooves, the pallet cleaning system can have a piping system with nozzles that are positioned over the grooves and the piping system can be lowered (or the pallet raised) to clean the grooves.

At 2710, the pallet is transported to the pallet stacking station. The pallet is then placed onto the stack at the pallet stacking station as illustrated at 2712, completing the stacking process.

In an example embodiment, an automated parking garage can also be configured to store both vehicles and other items such as containers and/or trailers. For example, where any number of parking spaces are not needed for parking cars, the parking spaces can be converted very quickly and easily for mini storage use. The mini storage use can be employed for a residential setting for storing household goods, an office setting that can provide shelf storage for documents, and/or a retail setting to provide storage space for goods to be sold (storage space can be leased as needed instead of having expensive storage space). Depending on the size of the container, a single or multiple containers can be stored in a parking space (e.g., a single container that is 88"×228"× 80" high or multiple smaller units. In an example embodiment, which will be descried in more detail herein, a single container may have multiple compartments with separate access.

Figure 28:
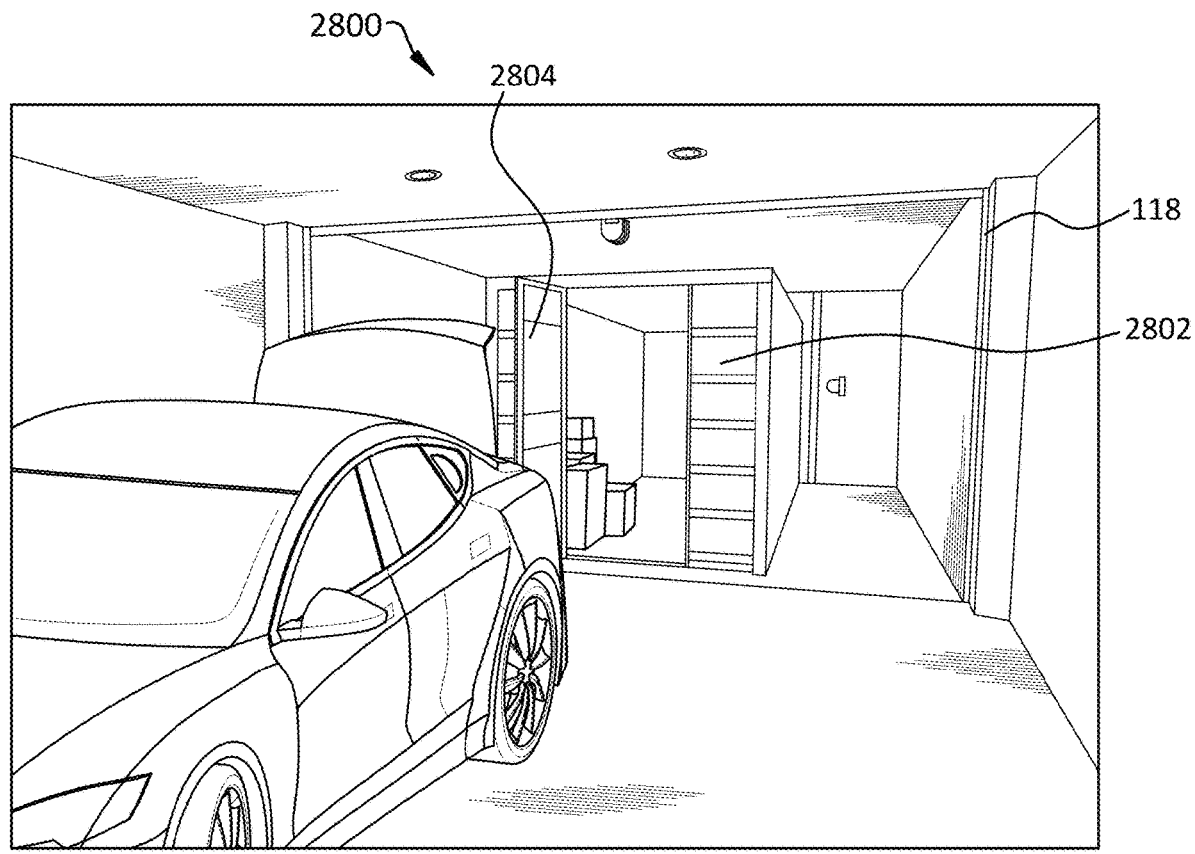
FIG. 28 is a perspective view of a terminal of an automated parking garage which can also store containers.

FIG. 28 is a perspective view 2800 of a terminal 118 of an automated parking garage 100 which can also store containers. A storage container 2802 is illustrated in the terminal 118. The door 2804 of the storage container is facing the exterior of the automated parking garage 100 to facilitate storage and removal or items from the storage container.

In an example embodiment, when vehicles are stored into a storage space, they are rotated one hundred and eight degrees before they are stored. This way the vehicle is facing the exit when the vehicle is retrieved from a storage space and moved into a terminal. However, as those skilled in the art can readily appreciate, if the container 2802 is rotated, when the container 2802 is later retrieved, the door 2804 will be facing the interior side of the terminal 118, which would be inconvenient for loading or unloading items from the container. As another example, if a trailer is being parked, if the trailer is rotated when being stored, when it is later retrieved the hitch will be facing the wrong way. The trailer would have to be manually moved out of the terminal to reconnected (or the trailer would have to be re-stored, causing it to be rotated again). Therefore, the controller for the automated parking garage is operable to determine whether what is being stored is a vehicle, which should be rotated, or a container or other item which should not be rotated, and act accordingly. For example, if a controller retrieves an item (such as a storage container or even a vehicle) from a storage space, when the item is returned to the storage space the controller is operable not to rotate the item. As another example, the user can employ a user interface at the terminal to indicate that the item being stored is not a vehicle and whether the container has a single compartment which should not be rotated, or if the container has multiple compartments, the container can be selectively rotated to place access into the compartment in a proper position.

Figure 29:
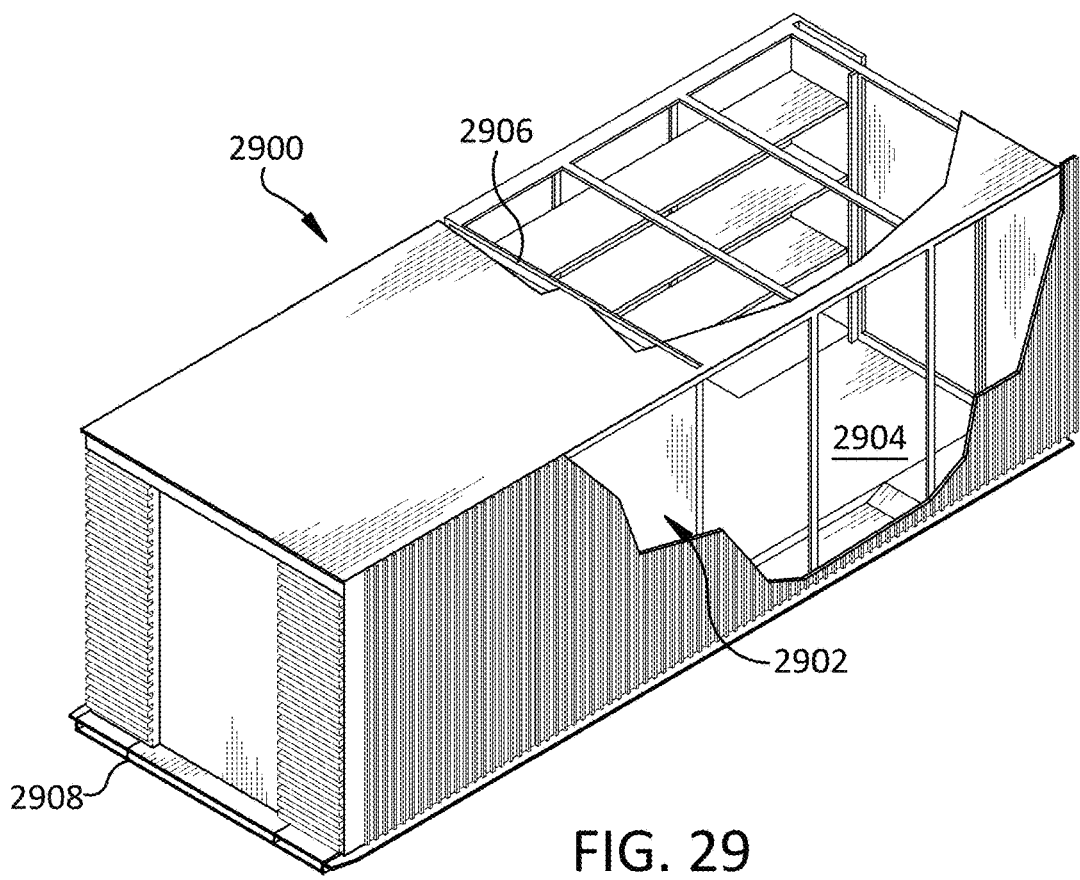
FIG. 29 is a first perspective, cutaway view of store container with multiple compartments.
Figure 30:
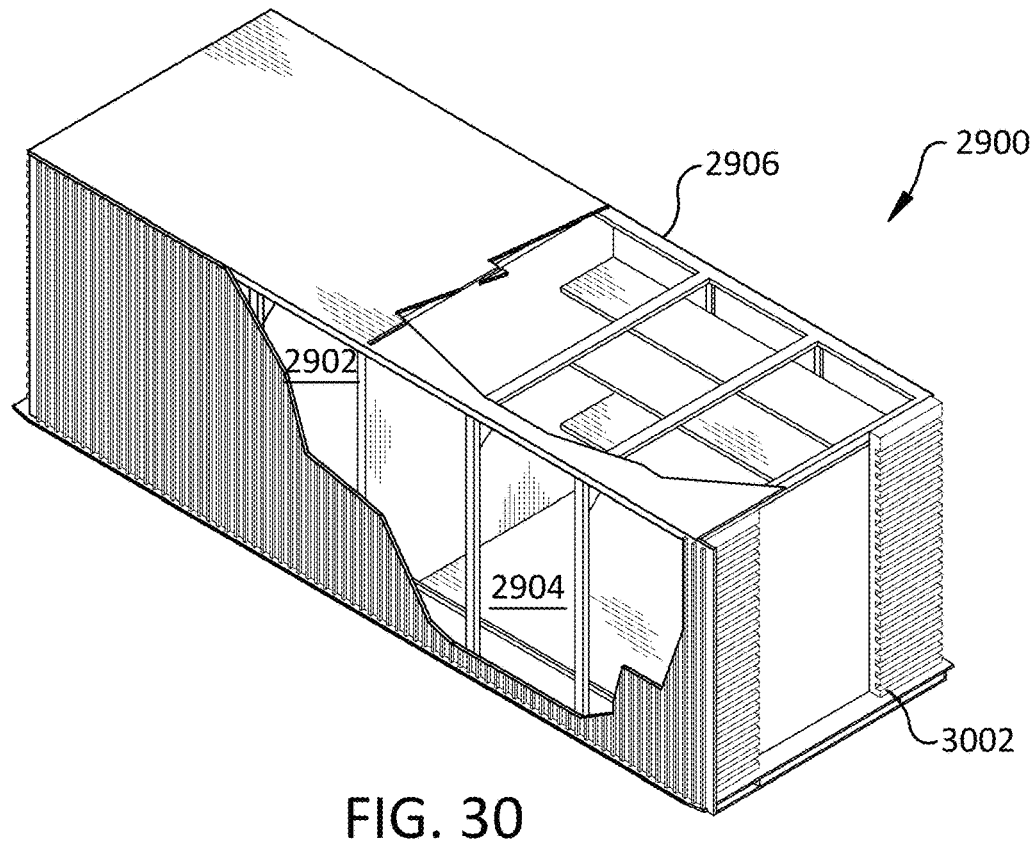
FIG. 30 is a second perspective, cutaway view of store container with multiple compartments.

FIGS. 29 and 30 illustrate an example of a container 2900 with multiple compartments. FIG. 29 is a first cutaway, perspective view of the container 2900 and FIG. 30 is a second cutaway, perspective view of the container 2900. The container 2900 comprises a first compartment 2902 and a second compartment 2904 that are separated by a divider 2906. Access to the first compartment 2902 is gained through door 2908. Access to the second compartment 2904 is gained through door 3002. As those skilled in the art can readily appreciate, because doors 2908 and 3002 are at opposite ends of the container 2900, depending on the position of the container, the container may have to be rotated so that the correct door 2908, 3002 is positioned for access for the appropriate compartment 2902, 2904 respectively when the container 2900 is transported to a terminal 118 to allow a customer to store or remove things.

Figure 31:
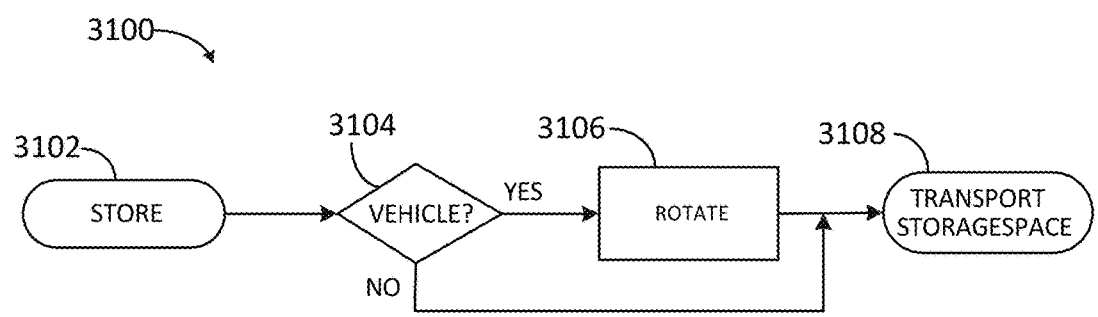
FIG. 31 is a block diagram illustrating an example methodology for storing vehicles and other items.
Figure 32:
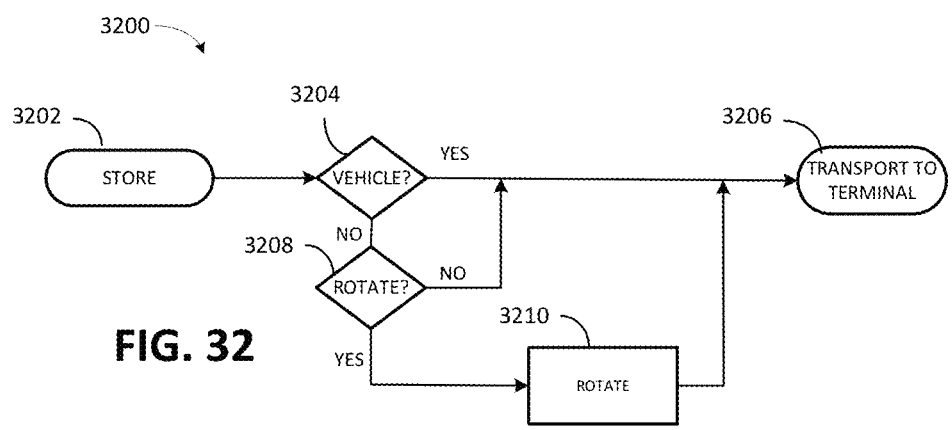
FIG. 32 is a block diagram illustrating an example of a method for retrieving vehicles and other items from a parking/storage space and delivering them to a terminal.

In view of the foregoing structural and functional features described above in FIGS. 28-30, methodologies 3100 and 3200 in accordance with an example embodiments will be better appreciated with reference to FIGS. 31 and 32. While, for purposes of simplicity of explanation, the methodologies 3100 and 3200 of FIGS. 31 and 32 respectively are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required. The methodologies 3100 and 3200 described herein is suitably adapted to be implemented in logic, such as hardware, software stored on a computer readable medium when executed by a processor, or a combination thereof. For example, the methodologies 3100 and 3200 can be implemented by logic 804 in controller 802 described in FIG. 8 and/or computer system 3300 described in FIG. 33.

FIG. 31 describes a methodology 3100 for storing a vehicle or item into a storage space 108 which can also be employed as a parking space. FIG. 32 describes a methodology 3200 for retrieving the vehicle or item from a storage space 108.

Referring first to FIG. 31, at 3102, a request is received to store an item that is inside a terminal 118. The item can be a container that was retrieved from a storage space 108 and moved to the terminal 118 or can be a new item such as a vehicle that entered the terminal 118 for parking.

At 3104, a determination is made whether the item to be stored is a vehicle and should be rotated. For example, if the item is a vehicle being parked, the vehicle should be rotated so that it is facing the exit when retrieved.

If, at 3104, the determination is made to rotate the item, e.g., a vehicle (YES), at 3106 the vehicle is rotated. In an example embodiment, the vehicle is rotated by the entry level carrier (e.g., ELC 116). The controller selectively operates the ELC 116, upper horizontal carrier 112, and/or VLC 110 to transport the item to the appropriate storage space 108 as indicated by 3108.

If, at 3104, the determination is made not to rotate the item being stored, e.g., the item is a container and not a vehicle. (NO), then the item is transported to the storage space 108 without being rotated. The controller selectively operates the ELC 116, HC 112, and/or VLC 110 to transport the item to the appropriate storage space 108 (FIG. 1) as indicated by 3108.

In an example embodiment, all items, vehicles, and storage containers are rotated. A decision on whether to rotate a container can be made when the container is retrieved, see for example FIG. 32. Thus, in some embodiments the action 3104 may not be performed.

Referring now to FIG. 32, at 3202, a request is received to retrieve an item that is stored inside a parking space 108 and bring it to a terminal 118. The item can be a container that is stored from a storage space 108 or can be a vehicle.

At 3204, a determination is made whether the item to be retrieved is a vehicle. In an example embodiment where vehicles are rotated when parked so that they are facing the exit of a terminal 118 when retrieved, the vehicle should not be rotated.

If, at 3204, the determination is made that a vehicle is being retrieved (YES), the vehicle is not rotated. The controller selectively operates the ELC 116, HC 112, and/or VLC 110 to transport the item to the appropriate terminal 118 as indicated by 3208.

If, at 3204, the determination is made that the item being retrieved is not a vehicle (NO), at 3208 a determination is made whether the item (e.g., a container) should be rotated. For example, if a single compartment container were rotated when stored, it would need to be rotated again when retrieved. As another example, if the container has multiple compartments, the container may need to be rotated so that the customer can have access to the appropriate compartment. In an example embodiment, the customer would specify which compartment to retrieve, or a compartment may be associated with the customer, when the customer makes the request at 3202. The controller would also have to either track or sense the orientation of the container when stored in order to determine the appropriate position for the container when moved into the terminal.

If, at 3208, the determination was made not to rotate the container (NO), the container is then moved into the terminal without being rotated. The controller selectively operates the ELC 116, HC 112, and/or VLC 110 to transport the container to the appropriate storage space 108 as indicated by 3108.

However, if at 3208, the determination was made to rotate the container (YES), the container is rotated as indicated by 3210. After rotation at 3210, the container is transported to the terminal 118 as indicated at 3206. The controller selectively operates a HC 112, and/or VLC 110 to transport the container to the appropriate terminal ELC 116. The controller selectively operates the ELC 116 delivering the container to the terminal to rotate the container and delivers the container to the terminal.

Figure 33:
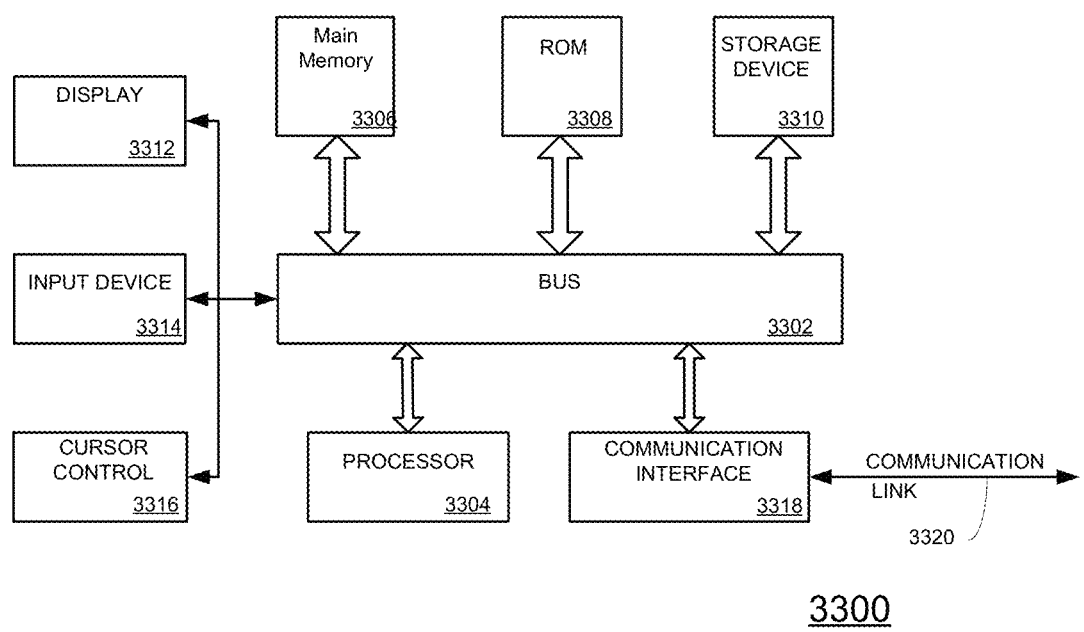
FIG. 33 is a block diagram illustrating an example of a computer system upon which an example embodiment can be implemented.

FIG. 33 is a block diagram that illustrates a computer system 3300 upon which an example embodiment may be implemented. For example, computer system 3300 can be employed to implement logic 804 of controller 802 (FIG. 8 and/or FIG. 18), logic 2102 of controller 2100 (FIG. 21), logic 2204 in controller 2202 (FIG. 22), and/or logic 2606 in controller 2604.

Computer system 3300 includes a bus 3302 or other communication mechanism for communicating information and a processor 3304 coupled with bus 3302 for processing information. Computer system 3300 also includes a main memory 3306, such as random access memory (RAM) or other dynamic storage device coupled to bus 3302 for storing information and instructions to be executed by processor 3304. Main memory 3306 also may be used for storing a temporary variable or other intermediate information during execution of instructions to be executed by processor 3304. Computer system 3300 further includes a read only memory (ROM) 3308 or other static storage device coupled to bus 3302 for storing static information and instructions for processor 3304. A storage device 3310, such as a magnetic disk or optical disk, is provided and coupled to bus 3302 for storing information and instructions.

Computer system 3300 may be coupled via bus 3302 to a display 3312 such as a cathode ray tube (CRT) or liquid crystal display (LCD), for displaying information to a computer user. An input device 3314, such as a keyboard including alphanumeric and other keys is coupled to bus 3302 for communicating information and command selections to processor 3304. Another type of user input device is cursor control 3316, such as a touch screen, a mouse, a trackball, or cursor direction keys for communicating direction information and command selections to processor 3304 and for controlling cursor movement on display 3312. This input device typically has two degrees of freedom in two axes, a first axis (e.g., x) and a second axis (e.g., y) that allows the device to specify positions in a plane.

An aspect of an example embodiment is related to the use of computer system 3300 for controlling the operations of an automated parking garage. According to one embodiment, controlling the operations of an automated parking garage is provided by computer system 3300 in response to processor 3304 executing one or more sequences of one or more instructions contained in main memory 3306. Such instructions may be read into main memory 3306 from another computer-readable medium, such as storage device 3310. Execution of the sequence of instructions contained in main memory 3306 causes processor 3304 to perform the process steps described herein. One or more processors in a multi-processing arrangement may also be employed to execute the sequences of instructions contained in main memory 3306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-volatile media. Non-volatile media include for example optical or magnetic disks, such as storage device 3310. Common forms of computer-readable media include for example RAM, PROM, EPROM, FLASH PROM, CD, DVD, SSD or any other memory chip or cartridge, or other medium from which a computer can read.

Computer system 3300 also includes a communication interface 3318 coupled to bus 3302. Communication interface 3318 provides a two-way data communication coupling to a communication link 3320. The communication link 3320 can be employed by computer system 3300 to control the operation of entry level carriers, vertical lift carriers and horizontal carriers, electric vehicle charging station, and/or autonomous vehicles as described herein. In an example embodiment, the communication link is coupled with a local network. For example, communication interface 3318 may be an integrated services digital network (ISDN) card or a modem to provide a data communication connection to a corresponding type of telephone line. As another example, communication interface 3318 may be a local area network (LAN) card to provide a data communication connection to a compatible LAN. Wireless links may also be implemented. In any such implementation, communication interface 3318 sends and receives electrical, electromagnetic, or optical signals that carry digital data streams representing various types of information.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally, and equitably entitled.

The invention claimed is:

1. An apparatus, comprising:
   an aisle;
   a terminal adjacent to the aisle;
   an entry level carrier configured to move along the aisle;
   a plurality of parking modules, parking modules comprise a combination of a terminal, a vertical storage unit having a plurality of storage spaces on a plurality of levels and a vertical lift carrier;
   wherein each of the plurality of modules are configured to align horizontal rails with each other to couple the horizontal rails with each other; and
   wherein each of the plurality of modules are interchangeable.

2. The apparatus set forth in claim 1, further comprising:
   a plurality of vertical lift carriers;
   a plurality of upper horizontal carriers on the plurality of levels;
   a controller coupled to the entry level carrier, the plurality of vertical lift carriers and the plurality of upper horizontal carriers;
   the controller is operable to employ a first vertical lift carrier selected from the plurality of vertical lift carriers and a first upper horizontal carrier selected from the plurality of upper horizontal carriers to transport a first vehicle from a first source to a first destination; and
   the controller is operable to employ a second vertical lift carrier selected from the plurality of vertical lift carriers and a second upper horizontal carrier to transport a second vehicle selected from a second source to a second destination while the first vehicle is in transit from the first source to the first destination.

3. The apparatus set forth in claim 2, the controller is operable to employ a plurality of vertical lift carriers selected from the plurality vertical lift carriers and a plurality of upper horizontal carriers selected from the plurality of upper horizontal carriers to concurrently transport a plurality of vehicles from a plurality of sources to a plurality of destinations while the first vehicle is in transit from the first source to the first destination and the second vehicle is in transit from the second source to the second destination.

4. The apparatus set forth in claim 2, the controller is further operable to wait before transporting the second vehicle on a carrier selected from the second vertical lift carrier and the second upper horizontal carrier responsive to determining the selected carrier is currently transporting the first vehicle.

5. The apparatus set forth in claim 2, the controller is further operable to select another carrier from a group consisting of the plurality of vertical lift carriers and the plurality of upper horizontal carriers for transporting the second vehicle responsive to determining a carrier selected from the group consisting of the second vertical lift carrier and the second upper horizontal carrier is currently transporting the first vehicle.

6. The apparatus set forth in claim 1, further comprising:
   a parking space configured to providing automatic electric vehicle charging selected from the group consisting of the plurality of storage spaces;

the parking space comprises a plurality of contacts on a bottom surface of the parking space, a switch with an electrical power source and coupled with a selected contact selected from the plurality of contacts;

wherein the switch provides electricity from the electrical power source to the selected contact while in a predetermined position; and wherein the switch does not provide electricity to the selected contact while the switch is not in the predefined position.

7. The apparatus set forth in claim 6, further comprising:

a pallet;

a plug unit mounted on a top surface of the pallet, the plug having a plurality of contacts mounted on the bottom surface of the plug and configured to be underneath the pallet when the plug is mounted on the top surface of the pallet;

a charger mounted on the top surface of the pallet;

a first cable coupling the plug unit to the charger; all these components is 1 unit a vehicle plug configured to plug into an electric vehicle on the top surface of the pallet and provide electrical power to the electric vehicle; and a second cable coupling the charger with the vehicle plug;

wherein the plug unit is configured that when the pallet is in a position when the plurality of contacts on the bottom surface of the pallet engage the plurality of contacts on the bottom surface of the parking space configured to providing electric vehicle charging, the plug unit causes the switch to move into the predetermined position, causing electricity from the power source to be provided to the electric vehicle via the plurality of contacts on the bottom surface of the parking space the plurality of contacts at the bottom of the pallet the plug unit, the first cable, the charger, the second cable, and the vehicle plug.

8. The apparatus set forth in claim 7, further comprising:

the controller is operable to determine whether to charge the electric vehicle;

the controller is operable to select a at least one first carrier from the group consisting of the entry level carrier, the plurality of vertical lift carriers, the plurality of upper horizontal carriers on the plurality of levels and employ the selected at least one first carrier to move the electric vehicle to the parking space configured to providing electric vehicle charging responsive to determining to provide the charge to the electric vehicle; and the controller is operable to select at least one second carrier from the group consisting of the entry level carrier, the plurality of vertical lift carriers, the plurality of upper horizontal carriers on the plurality of levels and employ the selected at least one second carrier to move the electric vehicle from the parking space configured to providing electric vehicle charging to another parking space selected from the plurality of parking spaces responsive when done charging the electric vehicle.

9. The apparatus set forth in claim 8, further comprising:

the controller is operable to determine a second electric vehicle to charge;

the controller is operable to select a at least one third carrier from the group consisting of the entry level carrier, the plurality of vertical lift carriers, the plurality of upper horizontal carriers on the plurality of levels and employ the selected at least one third carrier to move the electric vehicle to the parking space configured to providing electric vehicle charging responsive to determining to provide the charge to the second electric vehicle; and the controller is operable to select a at least one fourth carrier from the group consisting of the entry level carrier, the plurality of vertical lift carriers, the plurality of upper horizontal carriers on the plurality of levels and employ the selected at least one fourth carrier to move the electric vehicle from the parking space configured to providing electric vehicle charging to an assigned parking space selected from the plurality of parking spaces responsive when done charging the electric vehicle.

10. The apparatus set forth in claim 8, the controller is operable to determine a second electric vehicle to charge;

the controller is operable to select a temporary parking space selected from the group consisting of the plurality of parking spaces for storing the second electric vehicle responsive to determining whether to charge to the second electric vehicle and determining that the parking space configured to providing electric vehicle charging is unavailable;

the controller is operable to select a at least one third carrier from the group consisting of the entry level carrier, the plurality of vertical lift carriers, the plurality of upper horizontal carriers on the plurality of levels and employ the selected at least one third carrier to move the electric vehicle to the parking space configured to providing electric vehicle charging responsive to determining to provide the charge to the second electric vehicle and the parking space configured to providing electric vehicle charging is available; and the controller is operable to select a at least one fourth carrier from the group consisting of the entry level carrier, the plurality of vertical lift carriers, the plurality of upper horizontal carriers on the plurality of levels and employ the selected at least one fourth carrier to move the electric vehicle from the parking space configured to providing electric vehicle charging to an assigned parking space selected from the plurality of parking spaces responsive when done charging the electric vehicle.

11. The apparatus set forth in claim 1, further comprising:

a controller coupled to the entry level carrier, the vertical lift carrier and the upper horizontal carrier, the controller comprises logic operable to control the operation of the entry level carrier, the vertical lift carrier, and the upper horizontal carrier;

a data storage unit couple with the controller;

a wireless transceiver coupled with the transceiver;

wherein the terminal comprises a plurality of terminals;

wherein the aisle, the plurality of terminals adjacent to the aisle, the entry level carrier, the plurality of parking modules comprises an automated parking garage that comprises a plurality of parking spaces and is associated with the controller, the data storage unit, and the wireless transceiver;

the controller is operable to receive a first signal via the wireless transceiver from an autonomous vehicle requesting to park in the automated parking garage;

the controller is responsive to receiving the first signal to cause instructions to be provided to the autonomous vehicle to send a second signal when within a predefined proximity of the automated parking garage;

the controller is responsive to receiving the second signal to select a selected terminal from the plurality of terminals from the plurality of terminals and to cause coordinates to an area associated with the selected terminal and instructions to send a third signal when at the area associated with the selected terminal to be sent via the wireless transceiver to the autonomous vehicle; and the controller is responsive to receiving the third signal from the autonomous vehicle to exchange signals with the autonomous vehicle that causes the autonomous vehicle to move into the selected terminal.

12. The apparatus set forth in claim 11,
the controller is operable to receive, via the wireless transceiver, a signal from a second autonomous vehicle that comprises a request to park in the automated parking garage;
the controller is responsive to the signal from the second autonomous vehicle to determine whether a parking space is available; and
the controller is operable to cause the wireless transceiver to send a signal denying the request to park in the automated parking garage to the autonomous vehicle responsive to the signal from the second autonomous vehicle and determining a parking space is not available.

13. The apparatus set forth in claim 11,
the controller is operable to select a selected parking space from the plurality of parking spaces for parking the autonomous vehicle; and
the controller is operable to operate at least one carrier selected from the group consisting of the entry level carrier, the vertical lift carrier, and the upper horizontal carrier to move the autonomous vehicle from the selected terminal to the selected parking space.

14. The apparatus set forth in claim 13, the controller is further operable to select the selected parking space based on the dimensions of the autonomous vehicle.

15. The apparatus set forth in claim 1,
a controller coupled to the entry level carrier, the vertical lift carrier and the upper horizontal carrier, the controller comprises logic operable to control the operation of the entry level carrier, the vertical lift carrier, and the upper horizontal carrier;
a data storage unit couple with the controller;
a wireless transceiver coupled with the transceiver;
wherein the terminal comprises a plurality of terminals;
wherein the aisle, the plurality of terminals adjacent to the aisle, the entry level carrier, the plurality of parking modules comprises an automated parking garage that comprises a plurality of parking spaces and is associated with the controller, the data storage unit, and the wireless transceiver;
the controller is operable to receive a first signal via the wireless transceiver from an autonomous vehicle requesting to park in the automated parking garage;
the controller is responsive to the first signal to select a selected terminal from the plurality of terminals from the plurality of terminals and to cause coordinates to an area associated with the selected terminal and instructions to send a second signal when at the area associated with the selected terminal to be sent via the wireless transceiver to the autonomous vehicle; and
the controller is responsive to receiving the second signal from the autonomous vehicle to exchange signals with the autonomous vehicle that causes the autonomous vehicle to move into the selected terminal.

16. The apparatus set forth in claim 1, further comprising:
a pallet stacking station;
a pallet shuttle;
a pallet cleaning system that comprises a vacuum source, a piping system coupled with the vacuum source, and a plurality of nozzles coupled with the piping system;
a sensor;
a controller coupled with the pallet shuttle and pallet cleaning system, and the sensor;
the sensor is operable to detect a vehicle that was parked on a pallet exiting the terminal;
the controller is responsive to the sensor detecting the vehicle exiting the terminal to;
cause the pallet shuttle to retrieve the pallet,
cause the pallet shuttle to move the pallet to the pallet cleaning system,
cause the pallet cleaning system to clean the pallet, and
cause the pallet shuttle to move the pallet to the pallet stacking station after the pallet cleaning system has cleaned the pallet.

17. The apparatus set forth in claim 16, further comprising:
the pallet comprising a plurality of grooves; and
the plurality of nozzles of the pallet cleaning system are positioned over the plurality of grooves.

18. The apparatus set forth in claim 1, further comprising:
a selected storage space selected from the at least one of the plurality of storage spaces, the selected storage space is configured to store a storage container;
a horizontal carrier;
a controller coupled with the entry level carrier, the vertical lift carrier, and the horizontal carrier;
the controller is operable to cause the storage container to be moved from the selected storage space to the terminal;
the controller is operable to determine whether the container should be rotated so that an access to the selected space is in a correct position; and
the controller is operable to selectively rotate the container responsive to determining that the container should be rotated to the access to the selected storage space is in the correct position.

19. The apparatus set forth in claim 18, further comprising:
the controller is operable to transport vehicles and storage containers to the plurality of storage spaces;
the controller, responsive to determining a vehicle is being stored, is operable to cause the vehicle to be rotated before storing the vehicle in a first selected storage space selected from the plurality of storage spaces; and
the controller, responsive to determining a storage container is being stored, is operable to cause the storage container to be stored in a second selected storage space selected from the plurality of storage spaces without being rotated.

20. An apparatus, comprising:
an aisle;
a terminal adjacent to the aisle;
an entry level carrier configured to move along the aisle;
a vertical storage unit having a plurality of storage spaces on a plurality of levels;
a vertical lift carrier;
a parking space configured to providing automatic electric vehicle charging selected from the group consisting of the plurality of storage spaces;
the parking space comprises a plurality of contacts on a bottom surface of the parking space, a switch with an electrical power source and coupled with a selected contact selected from the plurality of contacts;

wherein the switch provides electricity from the electrical power source to the selected contact while in a predetermined position; and wherein the switch does not provide electricity to the selected contact while the switch is not in the predefined position.

21. The apparatus set forth in claim 20, further comprising:

a pallet;

a plug unit mounted on a top surface of the pallet, the plug having a plurality of contacts mounted on the bottom surface of the plug and configured to be underneath the pallet when the plug is mounted on the top surface of the pallet;

a charger mounted on the top surface of the pallet;

a first cable coupling the plug unit to the charger; all these components is 1 unit a vehicle plug configured to plug into an electric vehicle on the top surface of the pallet and provide electrical power to the electric vehicle; and a second cable coupling the charger with the vehicle plug;

wherein the plug unit is configured that when the pallet is in a position when the plurality of contacts on the bottom surface of the pallet engage the plurality of contacts on the bottom surface of the parking space configured to providing electric vehicle charging, the plug unit causes the switch to move into the predetermined position, causing electricity from the power source to be provided to the electric vehicle via the plurality of contacts on the bottom surface of the parking space the plurality of contacts at the bottom of the pallet the plug unit, the first cable, the charger, the second cable, and the vehicle plug.

22. The apparatus set forth in claim 21, further comprising:

the controller is operable to determine whether to charge the electric vehicle;

the controller is operable to select a at least one first carrier from the group consisting of the entry level carrier, the plurality of vertical lift carriers, the plurality of upper horizontal carriers on the plurality of levels and employ the selected at least one first carrier to move the electric vehicle to the parking space configured to providing electric vehicle charging responsive to determining to provide the charge to the electric vehicle; and the controller is operable to select at least one second carrier from the group consisting of the entry level carrier, the plurality of vertical lift carriers, the plurality of upper horizontal carriers on the plurality of levels and employ the selected at least one second carrier to move the electric vehicle from the parking space configured to providing electric vehicle charging to another parking space selected from the plurality of parking spaces responsive when done charging the electric vehicle.

23. The apparatus set forth in claim 22, further comprising:

the controller is operable to determine a second electric vehicle to charge;

the controller is operable to select a at least one third carrier from the group consisting of the entry level carrier, the plurality of vertical lift carriers, the plurality of upper horizontal carriers on the plurality of levels and employ the selected at least one third carrier to move the electric vehicle to the parking space configured to providing electric vehicle charging responsive to determining to provide the charge to the second electric vehicle; and the controller is operable to select a at least one fourth carrier from the group consisting of the entry level carrier, the plurality of vertical lift carriers, the plurality of upper horizontal carriers on the plurality of levels and employ the selected at least one fourth carrier to move the electric vehicle from the parking space configured to providing electric vehicle charging to an assigned parking space selected from the plurality of parking spaces responsive when done charging the electric vehicle.

24. The apparatus set forth in claim 23, the controller is operable to determine a second electric vehicle to charge;

the controller is operable to select a temporary parking space selected from the group consisting of the plurality of parking spaces for storing the second electric vehicle responsive to determining whether to charge to the second electric vehicle and determining that the parking space configured to providing electric vehicle charging is unavailable;

the controller is operable to select a at least one third carrier from the group consisting of the entry level carrier, the plurality of vertical lift carriers, the plurality of upper horizontal carriers on the plurality of levels and employ the selected at least one third carrier to move the electric vehicle to the parking space configured to providing electric vehicle charging responsive to determining to provide the charge to the second electric vehicle and the parking space configured to providing electric vehicle charging is available; and the controller is operable to select a at least one fourth carrier from the group consisting of the entry level carrier, the plurality of vertical lift carriers, the plurality of upper horizontal carriers on the plurality of levels and employ the selected at least one fourth carrier to move the electric vehicle from the parking space configured to providing electric vehicle charging to an assigned parking space selected from the plurality of parking spaces responsive when done charging the electric vehicle.

25. An apparatus, comprising:

an aisle;

a terminal adjacent to the aisle;

an entry level carrier configured to move along the aisle;

a vertical storage unit having a plurality of storage spaces on a plurality of levels;

a vertical lift carrier;

a pallet stacking station;

a pallet shuttle;

a pallet cleaning system that comprises a vacuum source, a piping system coupled with the vacuum source, and a plurality of nozzles coupled with the piping system;

a sensor;

a controller coupled with the pallet shuttle and pallet cleaning system, and the sensor;

the sensor is operable to detect a vehicle that was parked on a pallet exiting the terminal;

the controller is responsive to the sensor detecting the vehicle exiting the terminal to;

cause the pallet shuttle to retrieve the pallet, cause the pallet shuttle to move the pallet to the pallet cleaning system, cause the pallet cleaning system to clean the pallet, and cause the pallet shuttle to move the pallet to the pallet stacking station after the pallet cleaning system has cleaned the pallet.

26. The apparatus set forth in claim 25, further comprising:
the pallet comprising a plurality of grooves; and
the plurality of nozzles of the pallet cleaning system are positioned over the plurality of grooves.

* * * * *